US008166157B2

(12) United States Patent
Couture et al.

(10) Patent No.: US 8,166,157 B2
(45) Date of Patent: Apr. 24, 2012

(54) ENTERPRISE APPLICATION PERFORMANCE MONITORS

(75) Inventors: Gary R. Couture, Hollis, NH (US);
William V. Arneth, III, Westborough, MA (US); Anne-Marie G. Tattan, North Andover, MA (US); Louis A. Iannucci, Hudson, MA (US); Scott M. Blandford, Framingham, MA (US); Monica Chandra, Lexington, MA (US); Caroline M. Moran, Co. Galway (IE); Deirdre M. Quigley, Somerville, MA (US); Gavin E. Wrenn, Cambridge, MA (US); Lorcan B. Kelly, Cambridge, MA (US); John T. Travers, Cambridge, MA (US); Jean F. Armstrong, Groton, MA (US)

(73) Assignee: FMR LLC, Boston, MA (US)

(*) Notice: Subject to any disclaimer, the term of this patent is extended or adjusted under 35 U.S.C. 154(b) by 477 days.

(21) Appl. No.: 11/690,473

(22) Filed: Mar. 23, 2007

(65) Prior Publication Data
US 2008/0235075 A1 Sep. 25, 2008

(51) Int. Cl.
*G06F 15/173* (2006.01)
*G06F 15/16* (2006.01)
*G06F 11/00* (2006.01)

(52) U.S. Cl. ............... 709/224; 709/230; 370/252
(58) Field of Classification Search ............ None
See application file for complete search history.

(56) References Cited

U.S. PATENT DOCUMENTS

| | | | |
|---|---|---|---|
| 5,958,009 A | 9/1999 | Friedrich et al. | |
| 6,003,079 A | 12/1999 | Friedrich et al. | |
| 6,006,260 A | 12/1999 | Barrick et al. | |
| 6,067,565 A | 5/2000 | Horvitz | |
| 6,263,361 B1 | 7/2001 | Hoyer et al. | |
| 6,317,787 B1 | 11/2001 | Boyd et al. | |
| 6,434,513 B1 | 8/2002 | Sherman et al. | |
| 6,438,592 B1 | 8/2002 | Killian | |
| 6,466,918 B1 | 10/2002 | Spiegel et al. | |
| 6,591,298 B1 | 7/2003 | Spicer et al. | |
| 6,654,803 B1 * | 11/2003 | Rochford et al. | 709/224 |
| 6,701,363 B1 | 3/2004 | Chiu et al. | |
| 6,823,382 B2 * | 11/2004 | Stone | 709/224 |
| 6,928,471 B2 | 8/2005 | Pabari et al. | |
| 6,934,735 B1 | 8/2005 | Emens et al. | |

(Continued)

FOREIGN PATENT DOCUMENTS
WO   WO02/37229   5/2002

OTHER PUBLICATIONS

Moskovitz, D., "Measuring web performance—an overview," NetForum 2000 presentation (Oct. 7, 2000).

(Continued)

*Primary Examiner* — Wen-Tai Lin
(74) *Attorney, Agent, or Firm* — Fish & Richardson P.C.

(57) ABSTRACT

Methods, systems, and apparatus, including computer program products, implementing techniques for receiving a first information related to a first transaction associated with a first user session with a multi-tier enterprise application, the first information including performance data that is representative of how well components in at least two tiers of the enterprise application perform in executing the first transaction; and determining based on the first information whether the first transaction is associated with a prioritized aspect of the enterprise application, and if so, taking an action based on the determining.

52 Claims, 27 Drawing Sheets

U.S. PATENT DOCUMENTS

| | | | |
|---|---|---|---|
| 6,963,874 | B2 | 11/2005 | Kasriel et al. |
| 6,973,490 | B1 | 12/2005 | Robertson et al. |
| 7,039,015 | B1* | 5/2006 | Vallone et al. ............ 370/252 |
| 7,058,704 | B1 | 6/2006 | Mangipudi et al. |
| 7,197,557 | B1 | 3/2007 | Asar et al. |
| 7,231,442 | B2 | 6/2007 | Chen |
| 7,246,041 | B2 | 7/2007 | Fukuda et al. |
| 7,269,651 | B2 | 9/2007 | Olsson et al. |
| 7,328,265 | B2 | 2/2008 | Anstey et al. |
| 7,353,272 | B2 | 4/2008 | Robertson et al. |
| 7,373,376 | B1 | 5/2008 | Hamer et al. |
| 7,475,067 | B2 | 1/2009 | Clary et al. |
| 7,773,536 | B2 | 8/2010 | Lloyd et al. |
| 2002/0065864 | A1 | 5/2002 | Hartsell et al. |
| 2002/0178169 | A1 | 11/2002 | Nair et al. |
| 2003/0130982 | A1 | 7/2003 | Kasriel et al. |
| 2003/0131106 | A1 | 7/2003 | Kasriel |
| 2003/0145080 | A1 | 7/2003 | Breese et al. |
| 2003/0191837 | A1 | 10/2003 | Chen |
| 2004/0205184 | A1 | 10/2004 | Olsson et al. |
| 2004/0215768 | A1* | 10/2004 | Oulu et al. ............ 709/224 |
| 2005/0080661 | A1 | 4/2005 | Casati et al. |
| 2005/0107985 | A1 | 5/2005 | Agrawal et al. |
| 2005/0166138 | A1 | 7/2005 | Kundu |
| 2005/0256954 | A1 | 11/2005 | Shapira et al. |
| 2006/0015512 | A1* | 1/2006 | Alon et al. ............ 707/100 |
| 2006/0036400 | A1 | 2/2006 | Kasriel et al. |
| 2006/0059034 | A1 | 3/2006 | Iannucci et al. |

OTHER PUBLICATIONS

Amerson, M. et ai, "Design for Performance: Analysis of Download Times for Page Elements Suggests Ways to Optimize", (Apr. 18, 2001), IBM Web Site Team, AIM Division, accessed from: http://www.ibm.com/developerworks/websphere/library/techarticles/hipods/perform.html.

Broadwell, P., "Response Time as a Performability Metric for Online Services", (May 2004), Report No. UCB//CSD-04-1324; Computer Science Division (EECS), University of California, Berkeley, CA 94720.

Jin, L. et al., "Analysis on Service Level Agreements of Web Services," (Jun. 21, 2002), HP Laboratories Palo Alto HPL-2002-180, Accessed from: www.hpl.hp.com/techreports/2002/HPL-2002-180.pdf.

Matthew D Sarrel & Sahil Gambhir, "Early Warning". PC Magazine. New York: Dec. 11, 2001. vol. 20, Iss. 21; p. 159 (text).

Matthew D Sarrel & Sahil Gambhir, "Early Warning". PC Magazine. New York: Dec. 11, 2001. vol. 20, Iss. 21; p. 159 (graphic).

MacVittie, L., "Web Site Perspective Holds the Key to Performance Monitoring," Network Computing. Manhasset: Mar. 18, 2002. vol. 13, Iss. 6; p. 20 (2 pages).

* cited by examiner

Performance Matrix

| Category | Definition | Target | Minimum Acceptable Performance (MAP) | Page Weight & Object Count |
|---|---|---|---|---|
| Contact | Primary site page that serves as the initial user contact from public URL. Typically the login page. | 1.5 Sec (High-speed)<br>5 Sec (Dial-up) | 2 Sec (High-speed)<br>6 Sec (Dial-up) | 15 KB Max Size<br>4 Unique Objects |
| Authenticate | Page that displays after the user has logged in with their username and password. Typically the product landing page or FTP page. | 2.5 Sec (High-speed)<br>12 Sec (Dial-up) | 6 Sec (High-speed)<br>20 Sec (Dial-up) | 60 KB Max Size<br>14 Unique Objects |
| Search | Page that displays a user's broad search results after entering in a simple keyword(s). | 2 Sec (High-speed)<br>6 Sec (Dial-up) | 3 Sec (High-speed)<br>8 Sec (Dial-up) | 40 KB Max Size<br>8 Unique Objects |
| View | Page where a user can view content or data related to an information inquiry or a transaction being performed. | 3 Sec (High-speed)<br>6 Sec (Dial-up) | 6 Sec (High-speed)<br>8 Sec (Dial-up) | 40 KB Max Size<br>8 Unique Objects |
| Transact | Page that appears at the end of a user's predefined transaction that confirms its completion. | 3 Sec (High-speed)<br>6 Sec (Dial-up) | 6 Sec (High-speed)<br>13 Sec (Dial-up) | 10 KB Max Size<br>4 Unique Objects |
| Process | Page that appears after the user's submission of a complex, conditional search, ad-hoc query, modeling or mass record update request.<br>A standard wait page should be displayed to alert the user that the system is processing. | Wait Page:<br>1 Sec (High-speed)<br>5 Sec (Dial-up)<br>12 Sec max wait | Wait Page:<br>2 Sec (High-speed)<br>6 Sec (Dial-up)<br>20 Sec max wait | 10 KB Max Size<br>4 Unique Objects |
| Load | Page that appears based on a user's command to upload or download a file or data set. | N/A | N/A | N/A |

FIG. 27

ENTERPRISE APPLICATION PERFORMANCE MONITORS

CROSS-REFERENCE TO RELATED APPLICATIONS

This application is related to U.S. application Ser. No. 10/938,412, filed on Sep. 10, 2004.

BACKGROUND

This description relates to enterprise application performance monitors.

Applications of an enterprise ("enterprise applications") are typically implemented as multi-tier applications distributed over numerous computing systems. An example of a multi-tier application is a three-tier application having a data tier, a middle tier, and a client tier. The data tier can be comprised of one or more databases, which together contain the data relevant to the application. The middle tier acts as an intermediary between data in the data tier and the application's clients, managing interactions between application clients and application data. The middle tier controls and processes business logic, including how clients access data, how the application processes data, and how content is presented to clients. The client tier provides the application's user interface (e.g., a browser-based graphical user interface for a thin client application program or a thick client application program). Users communicate with the enterprise application through the user interface. The client tier interacts with the middle tier to make requests and to retrieve data from the data tier. The client tier then displays to the user the data retrieved from the middle tier. Conventionally, performance of an enterprise application is measured on an end-to-end round-trip basis from the start of a request by a user (e.g., as indicated by a depressing of a key or a button) to the time when the user can use the data supplied in response to the request.

SUMMARY

In general, in one aspect, the invention provides methods and apparatus, including computer program products, implementing techniques for receiving a first information related to a first transaction associated with a first user session with a multi-tier enterprise application, the first information including performance data that is representative of how well components in at least two tiers of the enterprise application perform in executing the first transaction; and determining based on the first information whether the first transaction is associated with a prioritized aspect of the enterprise application, and if so, taking an action based on the determining.

Implementations of the invention may include one or more of the following features.

The techniques for receiving a first information include techniques for receiving information related to a plurality of transactions, the received information including the first information. The plurality of transactions may be associated with the first user session. The received information may include performance data that is representative of how well components in at least two tiers of the enterprise application perform in executing respective ones of the plurality of transactions. The first transaction may correspond to an instance of a user request for data stored on one or more components in a data tier of the enterprise application. The first information may include performance data that is defined using a time-based metric.

The techniques for determining whether the first transaction is associated with a prioritized aspect of the enterprise application may include examining the first information to determine whether the first information includes an indicator that the first transaction corresponds to an instance of a user request for an aspect of the enterprise application that is associated with one of the following: a business critical function, a secondary function, or a tertiary function. The first transaction may correspond to an instance of a user request for an aspect of the enterprise application, and the techniques for determining whether the first transaction is associated with a prioritized aspect of the enterprise application may include examining the first information to identify a prioritization level that is associated with the user requested aspect. The prioritization level may include at least two discrete prioritization levels.

The enterprise application may be a web-based enterprise application and the first transaction may correspond to an instance of a user request for a web page that includes one or more objects formed by data stored on one or more components in a data tier of the enterprise application.

The techniques for determining whether the first transaction is associated with a prioritized aspect of the web-based enterprise application may include techniques for determining whether the first transaction is associated with a user request for a business critical function web page, a secondary function web page, or a tertiary function web page. The techniques for taking an action may include identifying a target performance value for the first transaction; and comparing the performance value included in the first information with the identified target performance value to determine whether the components in the at least two tiers of the enterprise application performed satisfactorily in executing the first transaction. The techniques for taking an action may include identifying a target performance value for each monitored element of the enterprise application that is involved in the first transaction; and for each monitored element, comparing its performance value included in the first information with its target performance value to determine whether the monitored element performed satisfactorily during the first transaction.

The techniques may further include providing in a graphical user interface, a visual indicator of a performance of the enterprise application in executing a plurality of transactions associated with one or more user sessions with the enterprise application, each of the plurality of transactions being associated with a prioritized aspect of the enterprise application, the first transaction being one of the plurality of transactions. The visual indicator may include one or more of the following: a pie chart, a bar version of a histogram, and a histogram. The visual indicator may provide a visual representation of a degree at which the performance of the enterprise application satisfies a customer experience while interacting with the enterprise application. The visual indicator may provide a visual cue to an enterprise application provider of a presence of a performance-related issue in the enterprise application that has a negative effect on the performance of the enterprise application. The visual indicator may further provide a visual cue to the enterprise application provider of an extent to which the performance-related issue in the enterprise application has a negative effect on the performance.

The techniques may further include providing in a graphical user interface, a visual indicator of a performance of one or more monitored elements of the enterprise application during an execution of a transaction associated with a user session with the enterprise application. The one or more monitored elements may include one or more of the following: a web page of the enterprise application, and a data service producer of the enterprise application. Each of the one or more monitored elements may be associated with a customer impact identifier. The customer impact identifier may include one of the following: a business critical function identifier, a secondary function identifier, and a tertiary function identifier.

In general, in another aspect, the invention features a system that includes an application performance monitoring tool operable to receive a first information related to a first transaction associated with a first user session with a multi-tier enterprise application, the first information including performance data that is representative of how well components in at least two tiers of the enterprise application perform in executing the first transaction; and determine based on the first information whether the first transaction is associated with a prioritized aspect of the enterprise application, and if so, take an action based on the determination.

Implementations of the invention may include one or more of the following features.

The application performance monitoring tool may receive the first information from a monitoring database that stores information related to transactions associated with user sessions with the enterprise application, the user sessions including the first user session. The monitoring database may store performance data that is representative of how well components in at least two tiers of the enterprise application perform in executing respective ones of the plurality of transactions. The first transaction may correspond to an instance of a user request for data stored on one or more components in a data tier of the enterprise application. The first information may include performance data that is defined using a time-based metric.

The application performance monitoring tool may be operable to determine whether the first transaction is associated with a prioritized aspect of the enterprise application by examining the first information to determine whether the first information includes an indicator that the first transaction corresponds to an instance of a user request for an aspect of the enterprise application that is associated with one of the following: a business critical function, a secondary function, or a tertiary function. The first transaction may correspond to an instance of a user request for an aspect of the enterprise application. The application performance monitoring tool may be operable to determine whether the first transaction is associated with a prioritized aspect of the enterprise application by examining the first information to identify a prioritization level that is associated with the user requested aspect. The prioritization level may include at least two discrete prioritization levels.

The application performance monitoring tool may be further operable to identify a target performance value for the first transaction; and compare the performance value included in the first information with the identified target performance value to determine whether the components in the at least two tiers of the enterprise application performed satisfactorily in executing the first transaction. The application performance monitoring tool may be further operable to identify a target performance value for each monitored element of the enterprise application that is involved in the first transaction; and for each monitored element, compare its performance value included in the first information with its target performance value to determine whether the monitored element performed satisfactorily during the first transaction.

The application performance monitoring tool may be further operable to provide in a graphical user interface, a visual indicator of a performance of the enterprise application in executing a plurality of transactions associated with one or more user sessions with the enterprise application, each of the plurality of transactions being associated with a prioritized aspect of the enterprise application, the first transaction being one of the plurality of transactions.

The application performance monitoring tool may be further operable to provide in a graphical user interface, a visual indicator of a performance of one or more monitored elements of the enterprise application during an execution of a transaction associated with a user session with the enterprise application.

The system may further include a correlation engine operable to capture, measure, and analyze error data and informational logs generated by the application performance monitoring tool.

The system may further include a customer service level monitor operable to communicate summary real-time application performance information for one or more enterprise applications for different time periods.

The system may further include a systems infrastructure dashboard that enables an end-to-end systems health view for each of the tiers of the enterprise application.

The system may further include a customer experience dashboard that summarizes metrics across one or more of the following data sources: real-time and historical; actual and synthetic traffic; page, producer and operational performance data; internally and externally sourced performance data; internal tools to support internal customers and external products to support external customers.

The system may further include an administrative console operable to enable a user to administer additions, modifications and deletions of monitoring tool supporting data, and corresponding associations and mappings information, the monitoring tool supporting data including URI data, producer data, node data, and realm data, and the mappings information including functions, page to function mappings, page to group mappings, page to producer mappings, and producer to group mappings.

The system may further include an alert notification engine configured with a set of robust configurable rules, and operable to apply the set of rules against data collected by an application performance monitoring tool, to detect abnormalities, trends, and/or short and long term performance issues, and generate an alert based on the application of the set of rules.

The system may further include an outlier data analysis tool operable to examine outlier data against a plurality of variables to determine whether there is a common cause or a number of common causes of the outlier data, and take an action based on the determination.

The system may further include a third party application monitoring tool operable to measure and monitor the performance of third party applications that are incorporated into the various product suites and used by customers; and measure and monitor key product pages and transactions from outside of an enterprise network so as to gather information on complete web page performance and total roundtrip performance time between a customer client computer and the enterprise network.

In general, in another aspect, the invention features a method that includes providing a structure that imposes checkpoints during design, development, testing and transition, and live production stages of an enterprise application lifecycle, such that performance of the enterprise application is based on metrics associated with customer impact.

Implementations of the invention may include one or more of the following features.

The method may further include identifying one or more elements of the enterprise application as elements to be monitored from a customer impact perspective; and for each identified element, associating the element with a customer impact identifier. Each identified element may be associated with one of the following customer impact identifiers: a business critical function identifier, a secondary function identifier, and a tertiary function identifier. The method may further include performing a benchmark process to determine a target performance value for each element of the enterprise application to be monitored from a customer impact perspective. The benchmark process may be performed at periodic intervals, and the target performance value for each element of the enterprise application to be monitored may be updated at the periodic intervals. The method of performing the benchmark process for each element to be monitored includes determining a first value representative of a predefined percentile of measured performance values for each of the plurality of days of the periodic interval; identifying a median of the first values; and setting the target performance value for the element based on the identified median of the first values. The predefined percentile may be a $92^{nd}$ percentile.

The details of one or more examples are set forth in the accompanying drawings and the description below. Further features, aspects, and advantages of the invention will become apparent from the description, the drawings, and the claims.

DESCRIPTION OF DRAWINGS

FIGS. 4-25 each show a screenshot generated by an application performance monitoring tool.

FIG. 27 shows a performance matrix.

DETAILED DESCRIPTION

This description provides an example of a suite of tools that may be developed and deployed by an enterprise to monitor the performance of one or more enterprise applications. This suite of tools can be implemented by leveraging new technologies, such as rich Internet applications, to provide a robust and high-quality user experience. Although the example enterprise applications provided in this description relate to web-based products, the techniques are also applicable to non-web-based products, such as thin/thick client enterprise applications business critical function elements. Of the 24 business critical function elements of the NetBenefits product, in the most-recent 5 minute interval, 22 (i.e., the dark green portion of the pie chart) have response times that meet or exceed the target performance value, 1 (i.e., the gray portion of the pie chart) business critical function element has not been requested, and 1 (i.e., the yellow portion of the pie chart) business critical function element has a measured performance that is acceptable (the threshold for what is "acceptable" may be configured by the enterprise as a percentage of the target performance value, e.g., within 85% of the target performance value). In some examples, a portion of the pie chart may be colored red indicative of a measured performance value of the business critical function element that is unacceptable (e.g., fails to be within 85% of the target performance value). Although the color convention of the illustrated pie chart is green/gray/yellow/red, other color conventions or visual indices can be used. Further, the number of wedges of the pie chart can vary based on the product's current performance, e.g., the eWorkplace product pie chart 410 has two wedges totaling 35 business critical function elements.

Figure 1:
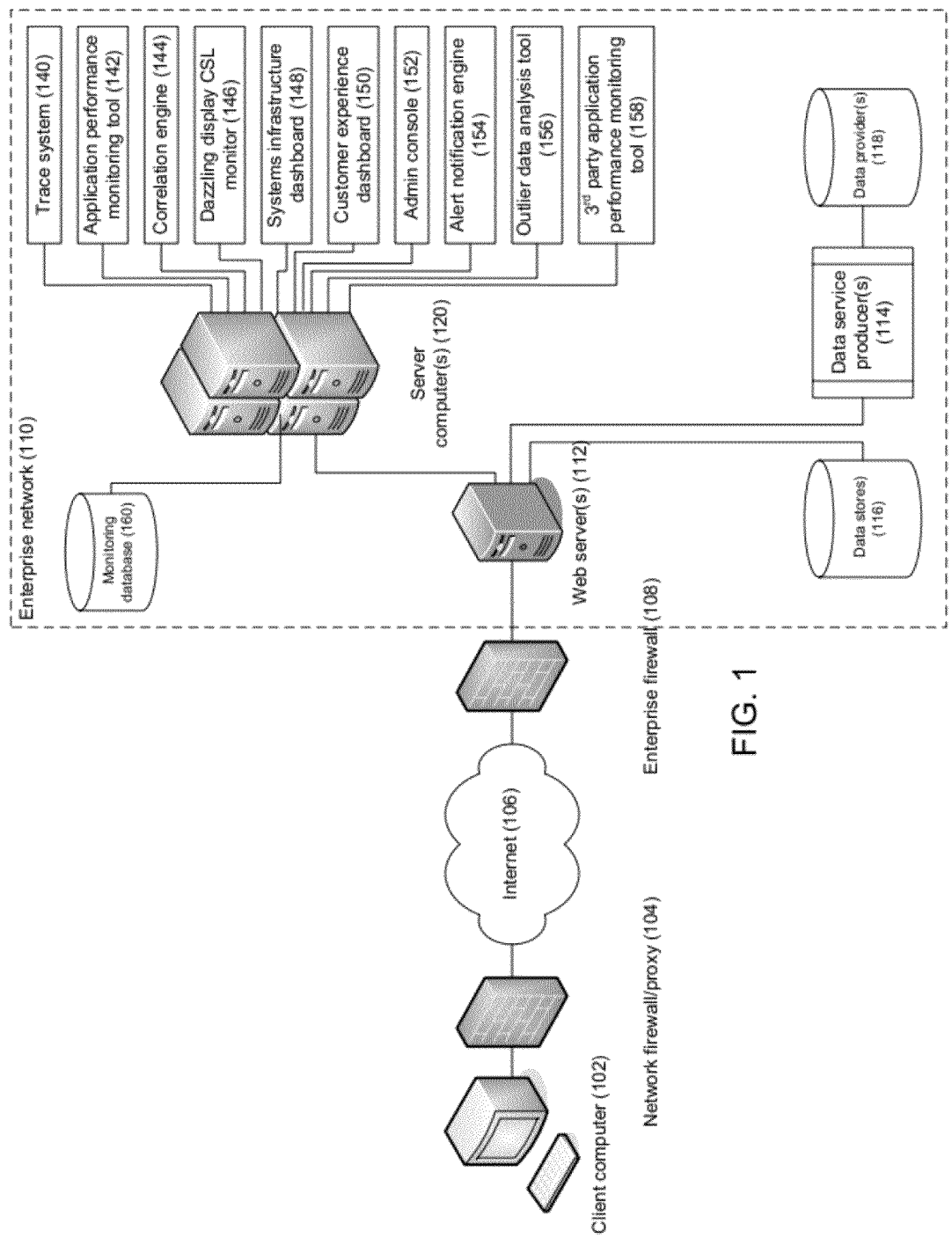
FIGS. 1 and 2 each show a data access system.
Figure 2:
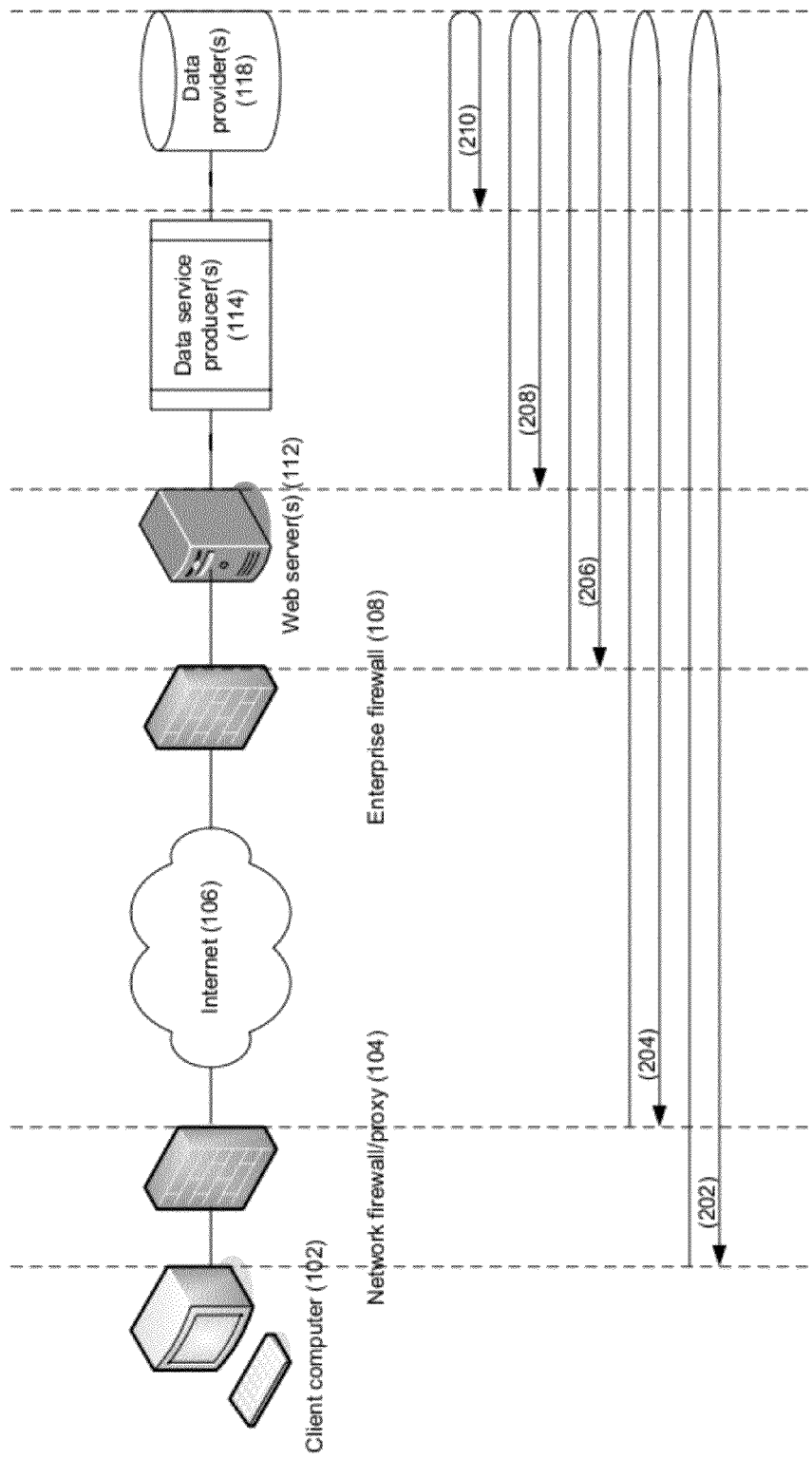
Figure 3:
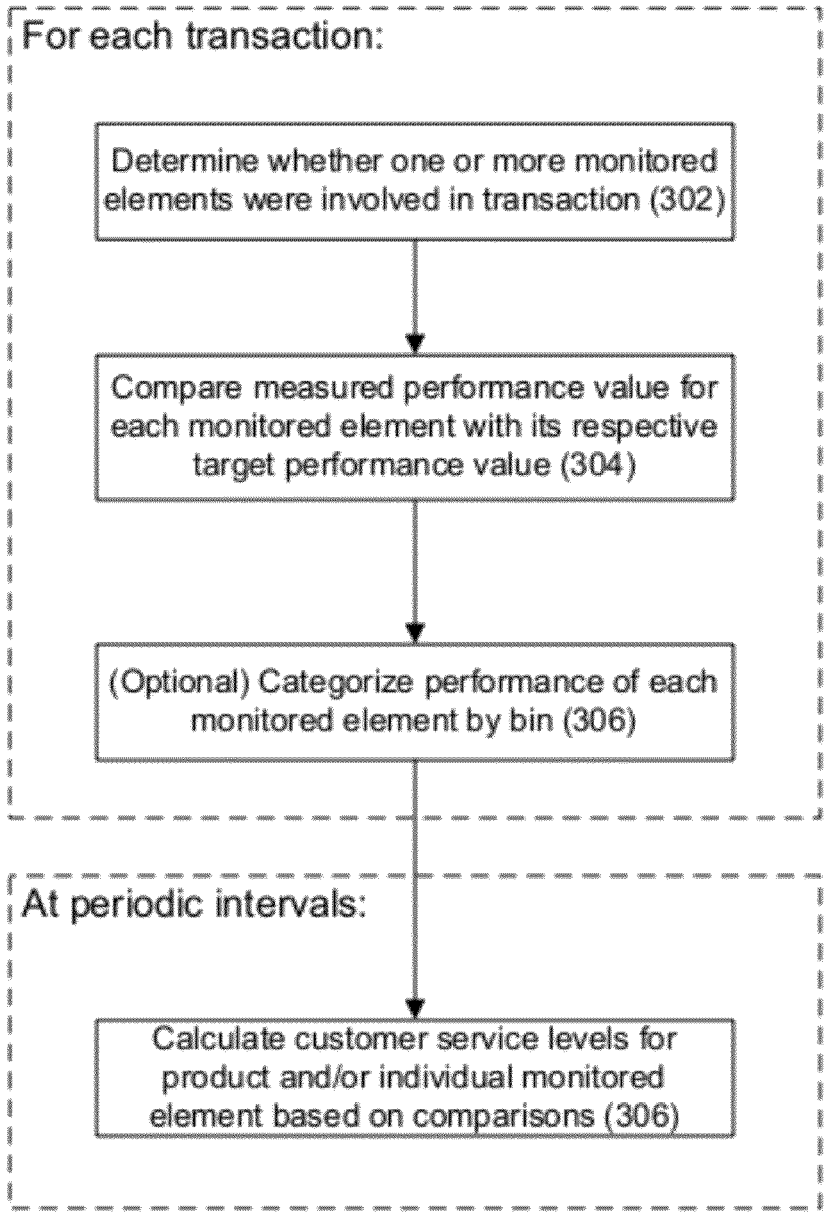
FIG. 3 shows a flowchart of a process for determining a customer service level of an enterprise application.
Figure 4:
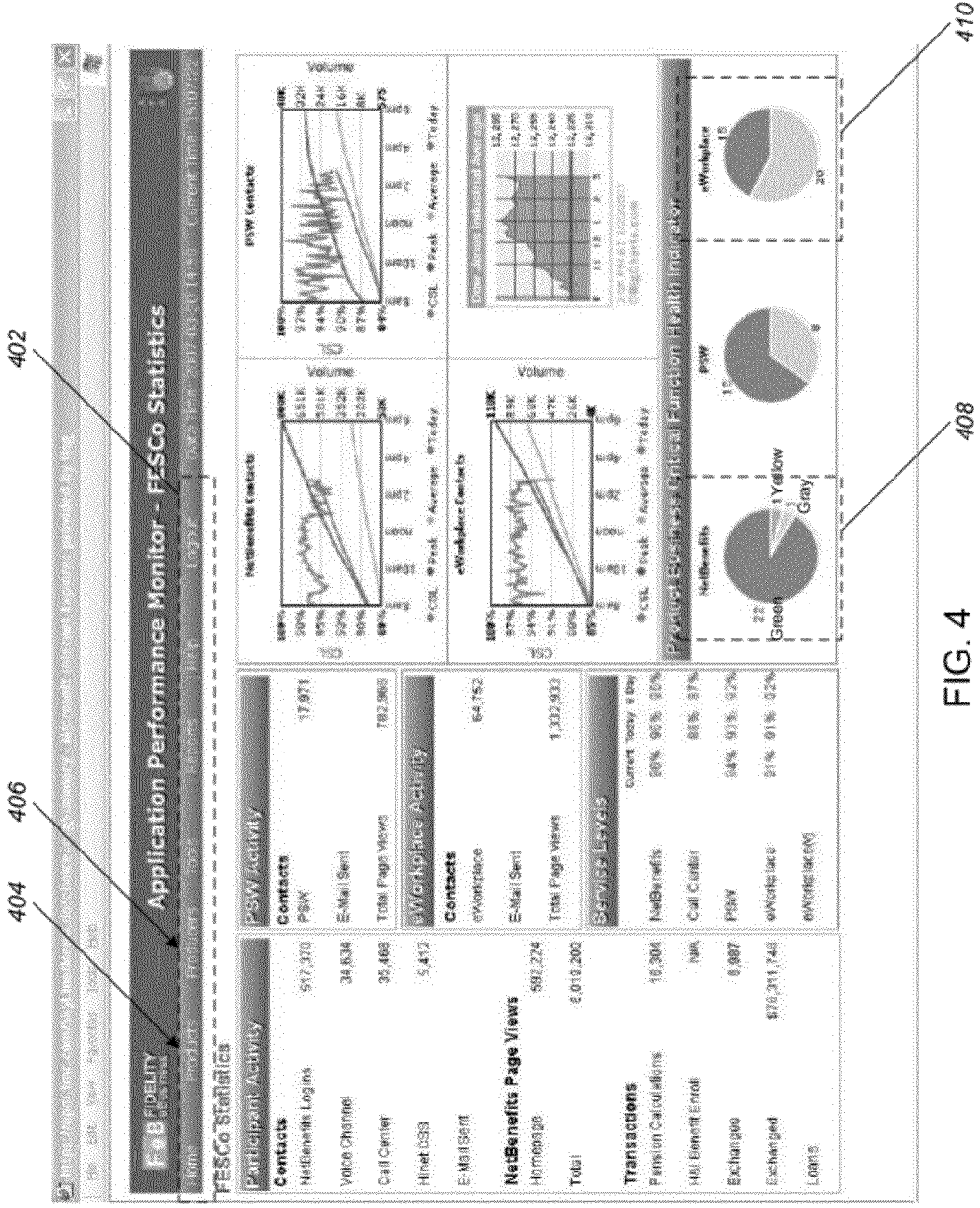
Figure 5:
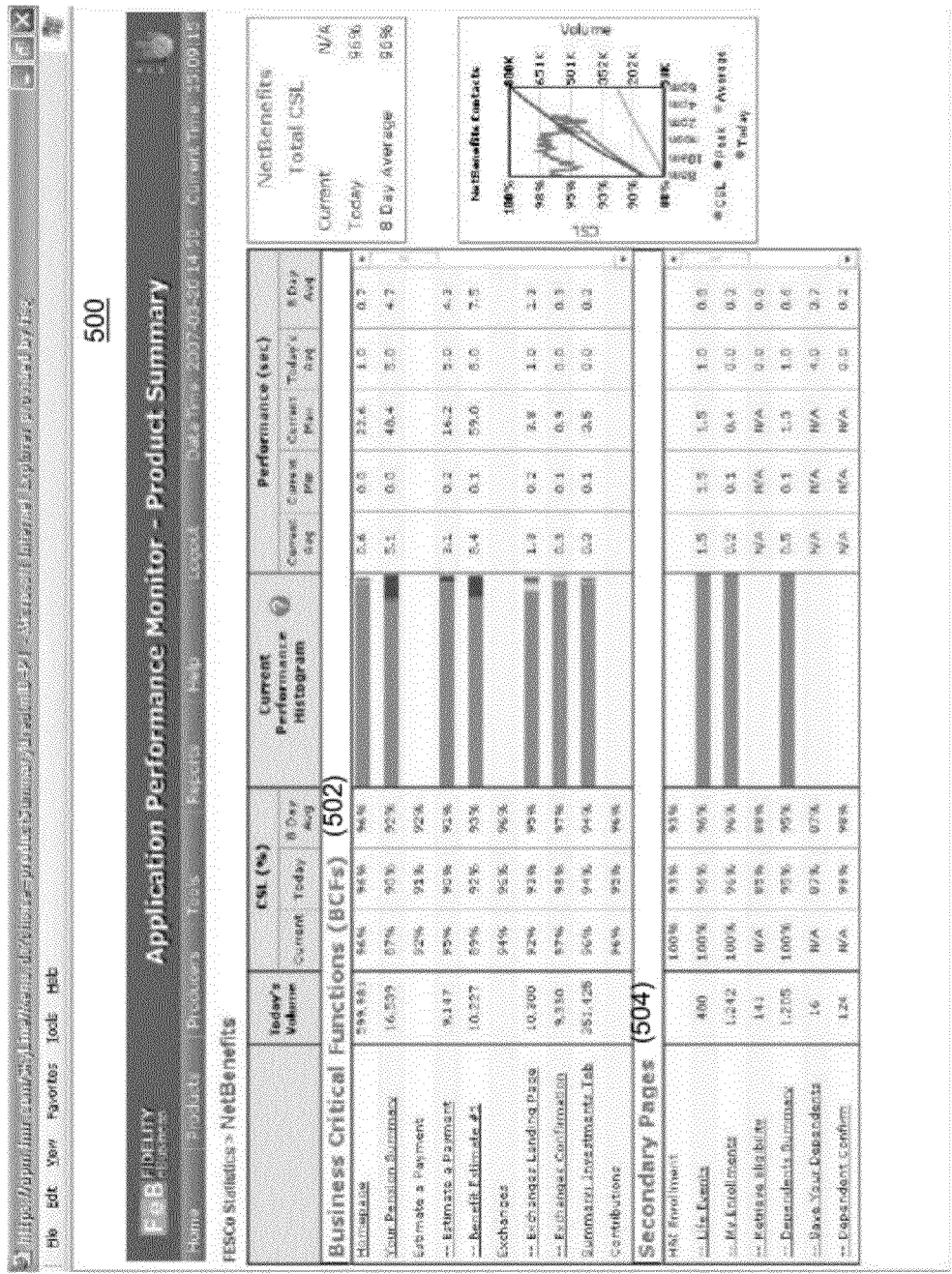

When a user (e.g., an employee of the enterprise) clicks on a "Products" link 404 provided on a navigation bar 402 of the Business Unit Homepage 400, a menu of products is provided. The user may select a "NetBenefits" link from the menu of products to obtain more detailed information about the performance of the monitored elements of the NetBenefits product that are web pages. In the example screenshot of FIG. 5, one portion of a NetBenefits dashboard 500 is provided in a "Business Critical Functions (BCFs)" window 502 and another portion of the NetBenefits dashboard 500 is provided in a "Secondary Function Pages" window 504. A slider located on the right-hand portion of each window 502, 504 enables the user to view different portions of the NetBenefits dashboard 500. In the displayed portion, detailed information about seven (e.g., "Homepage," "Your Pension Summary," "-Estimate a Payment," "-Benefit Estimate #1," "-Exchanges Landing Page," "-Exchanges Confirmation," and "Summary: Investments Tab") BCF web pages of the NetBenefits product are provided. The information for the "Homepage" includes the number of views of the Homepage (e.g., 599,981), its current CSL (e.g., 96%), the average CSL for the past 24-hours (e.g., 96%), the average CSL over an 8-day period (e.g., 96%), a bar version of a histogram that visually depicts today's health of the NetBenefits Homepage based on predefined bins, and performance values (e.g., current average, current minimum, current maximum, today's average, and 8-day average). In some implementations, the percentage value in the "Current" CSL column is color coded to visually depict changes from interval to interval. Suppose, for example, that the 5-minute interval of the NetBenefits Homepage preceding the current 5-minute interval had a CSL of 94%. The current CSL of 96% may be color coded in green to show an improvement in performance. Suppose, in another example, that the 5-minute interval of the NetBenefits Your Pension Summary page preceding the current 5-minute interval had a CSL of 992%. The current CSL of 87% may be color coded in yellow or red to show a decline in performance.

Figure 6:
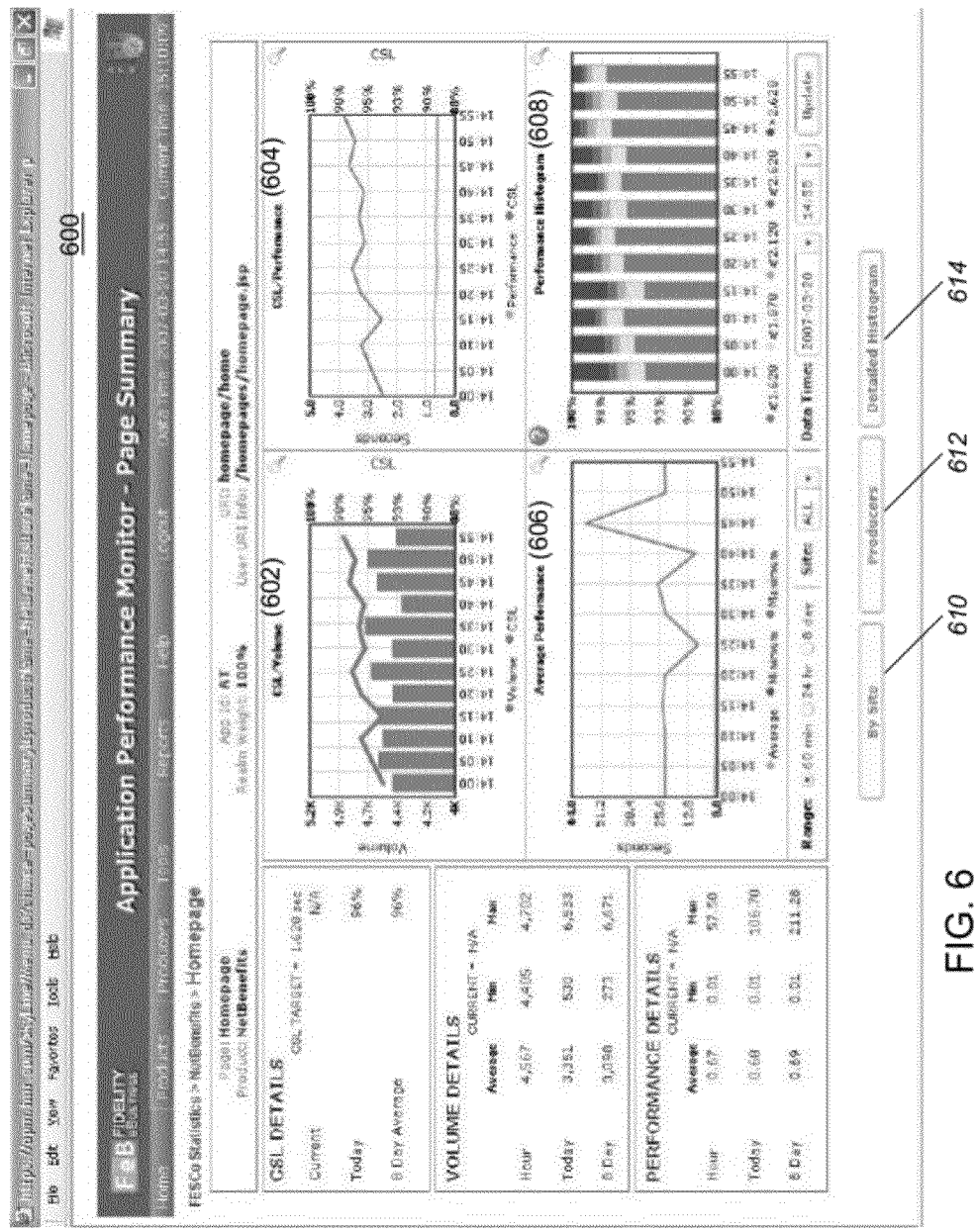

For an even more detailed breakdown of the performance of the NetBenefits Homepage, the user may click on a page name, e.g., the "Homepage" link 506 to navigate to a Page Summary page 600 depicted in FIG. 6. The Page Summary page 600 provides a number of graphs (e.g., CSL/Volume 602, CSL/Performance 604, Average Performance 606, and Performance Histogram 608) that visually depict performance data associated with the Homepage, for example, for each 5-minute interval during a 60-minute period. If desired, the user can click on the magnifying glass icon displayed in the upper-right hand corner of each of the windows containing the graphs 602, 604, 606, and 608 to obtain a larger display of the graph information. The Page Summary page 600 provides for high user interaction with the information by enabling the user to modify parameters (e.g., range: 60 min, 24 hr, 8 day, site: ALL, MMK, MRO, DAL, data time by date and time) and to update the graph that is presented in the Page Summary page 600. The Detailed Performance Histogram 608 shows the CSL values for an individual page or producer that is a monitored element using five color coded buckets as follows:

| | Description | Calculation | Color |
|---|---|---|---|
| Bucket 1 | Less than or equal to the CSL | x <= CSL | Green |
| Bucket 2 | Exceeding the CSL but less than or equal to CSL + First Threshold | CSL < x <= (CSL + T1) | Light Green |
| Bucket 3 | Exceeding the First Threshold but less than CSL + Second Threshold | (CSL + T1) < x <= (CSL + T2) | Yellow |
| Bucket 4 | Exceeding the Second Threshold but less than CSL + Third Threshold | (CSL + T2) < x <= (CSL + T3) | Orange |
| Bucket 5 | Exceeding CSL + Third Threshold | x > (CSL + T3) | Red |

The threshold values T1, T2, and T3 can vary from product-to-product and/or element-to-element. The Performance histogram 608 allows users to view detailed histogram stack bar graphs, which display the percentage of requests that meet, and the percentage that exceed, the Customer Service Level (CSL).

Figure 7:
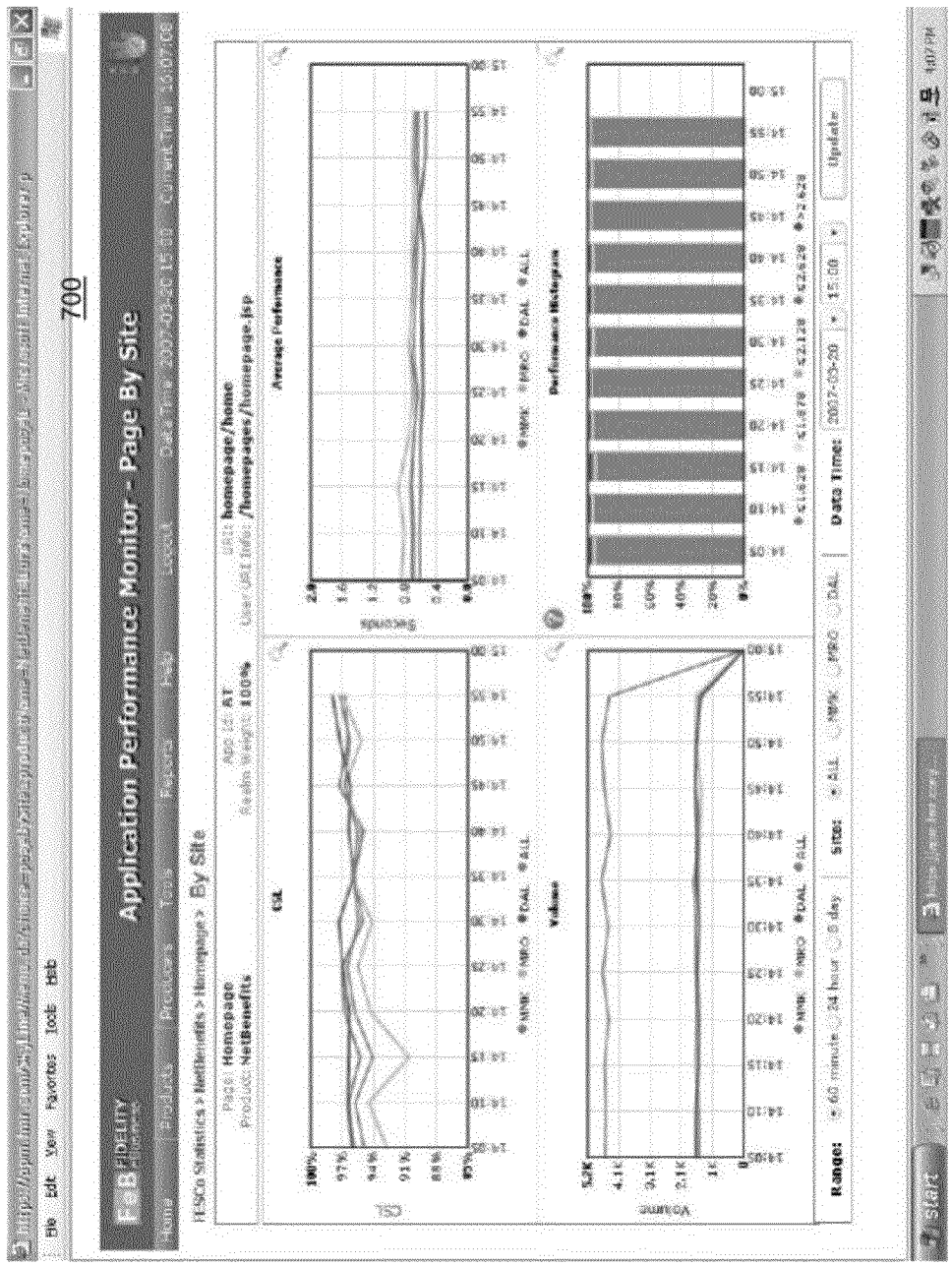
Figure 8:
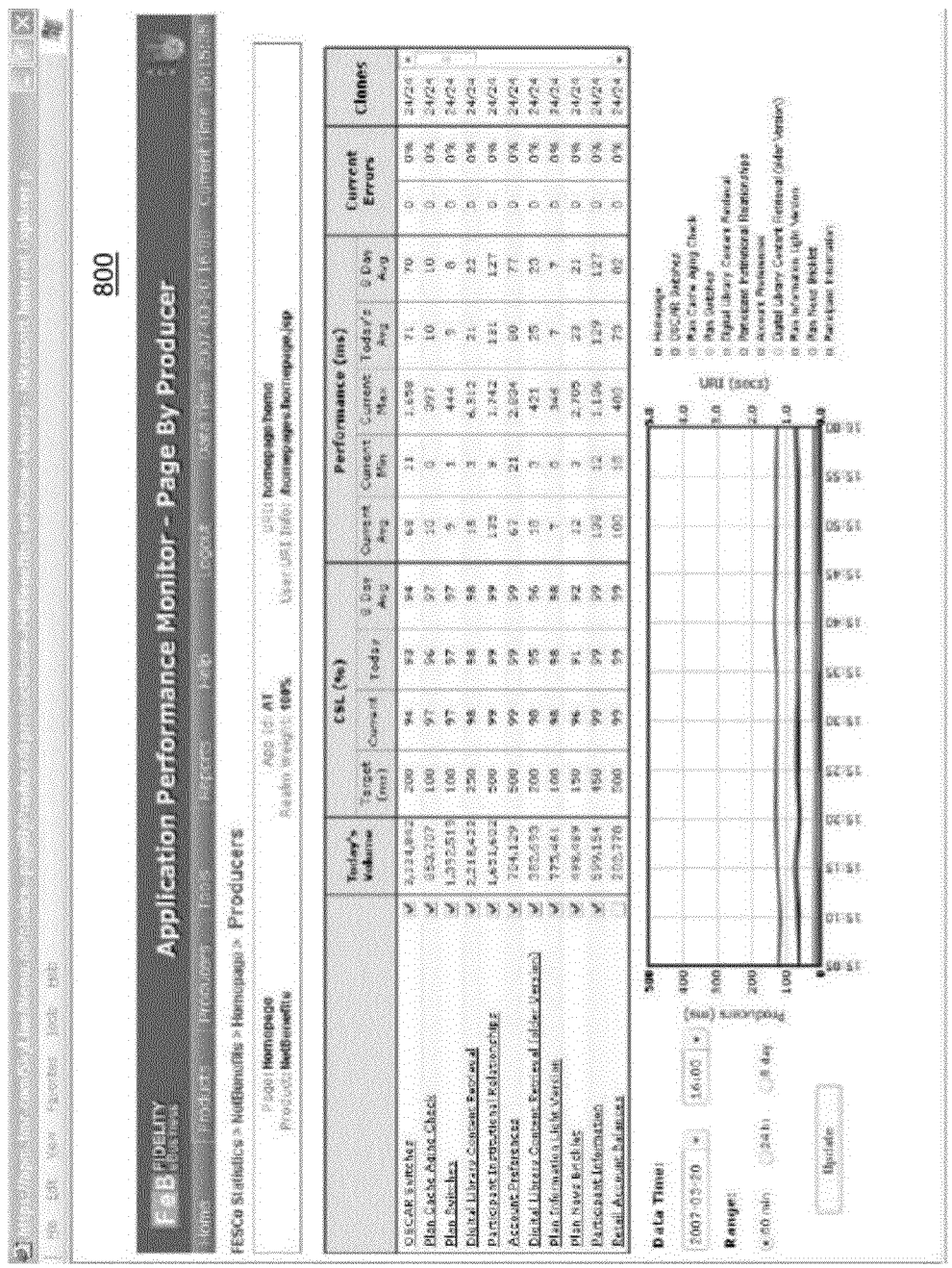
Figure 9:
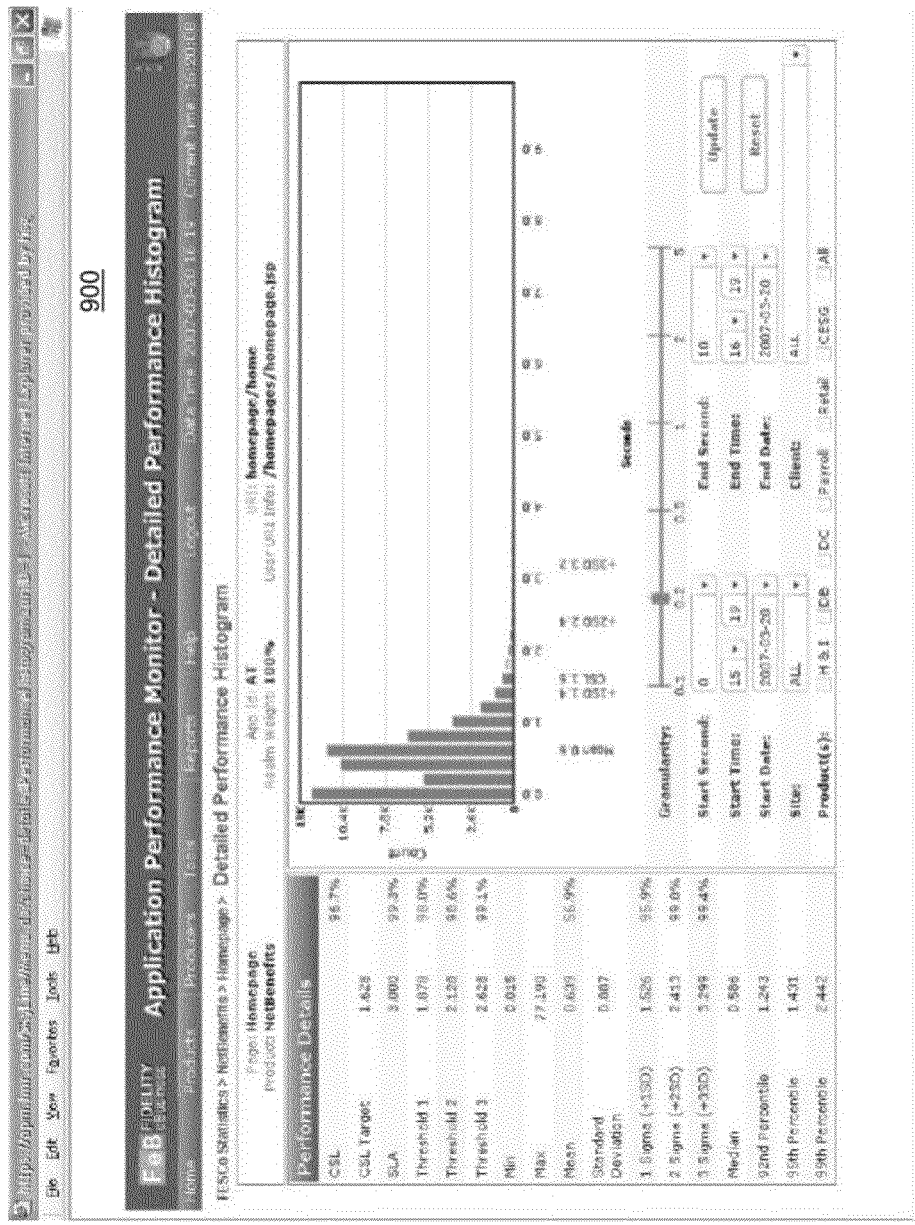

The Page Summary page 600 also provides selectable buttons: "By Site," 610 "Producers," 612 and "Detailed Histogram," 614 that enable the user to drill down to pages which show the performance data using different metrics. For example, clicking on the "By Site" button 610 navigates the user to the example Page by Site page 700 shown in FIG. 7, in which the performance data (e.g., CSL, Average Performance, Volume, and Page Load Histogram) is broken down by physical site (e.g., ALL, MMK, MRO, and DAL). Likewise, clicking on the "Producers" button 612 navigates the user to the example Page by Producer page 800 shown in FIG. 8, in which the performance data (e.g., Today's volume, CSL, Performance, Current Errors, and Clones) is shown for all of the data service producer (e.g., OSCAR switches, Plan Cache Aging Check, and Plan Switches) for the NetBenefits Homepage. Clicking on the "Detailed Histogram" button 614 navigates the user to the example Detailed Performance Histogram page 900 shown in FIG. 9, which allows a user to change the variables based on time, site, customer or product mix to help pinpoint performance issues or events based selected parameters. The example Detailed Performance Histogram page 900 also include Performance Details measured in different/additional performance metrics including standard deviation (e.g. 1 sigma, 2 sigma) and percentiles (e.g. $92^{nd}$ percentile, $95^{th}$ percentile, and $99^{th}$ percentile).

Figure 10:
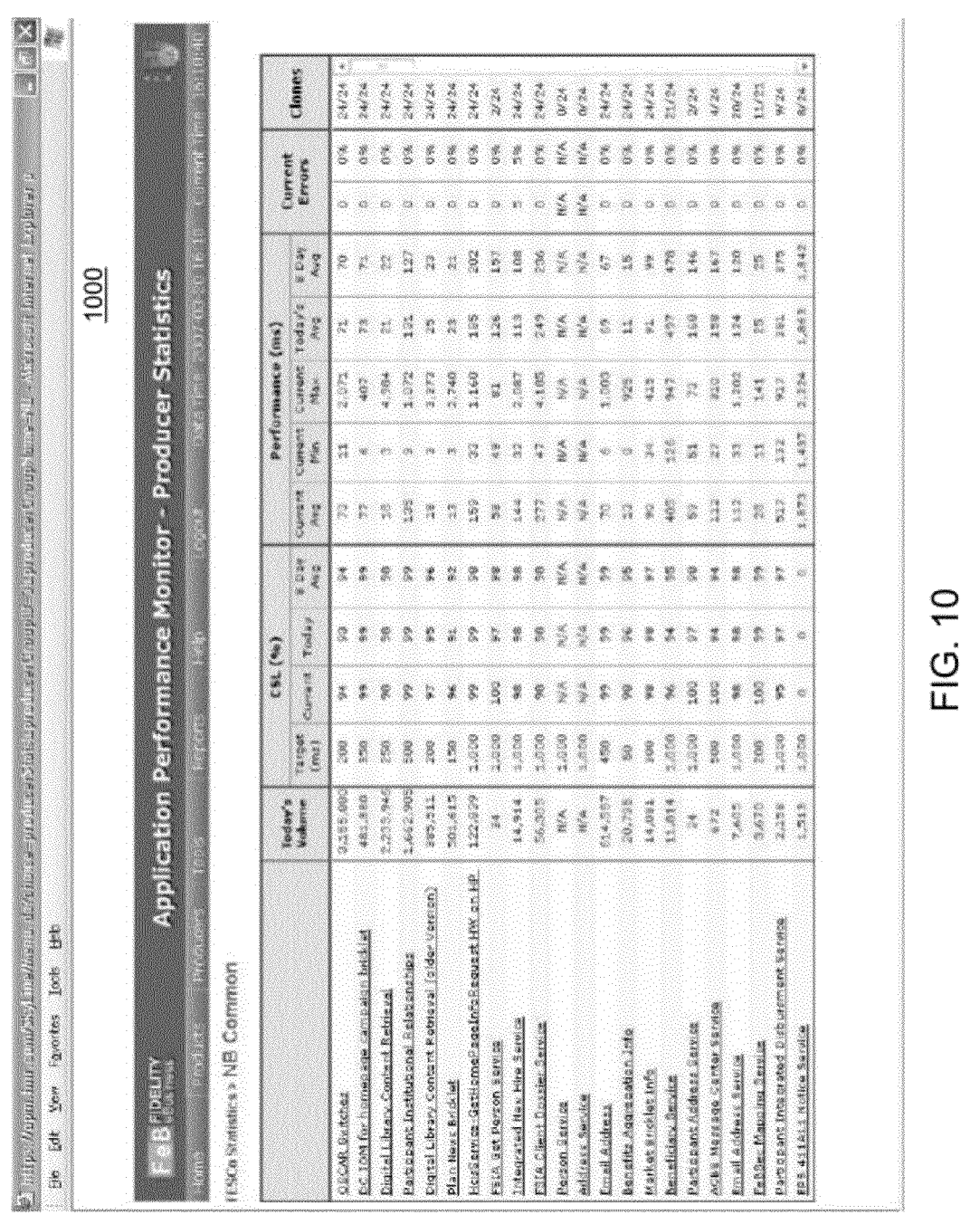
Figure 11:
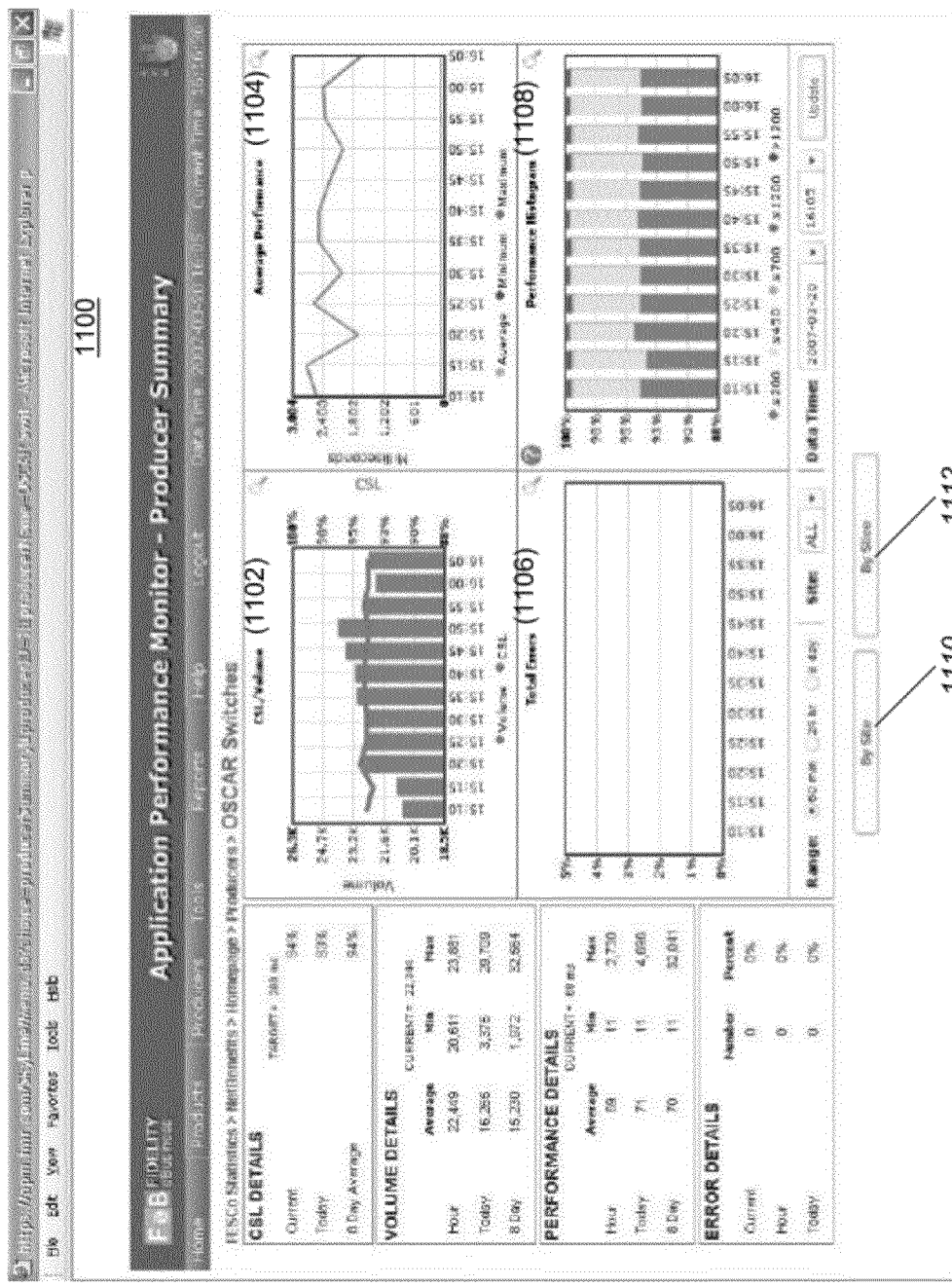
Figure 12:
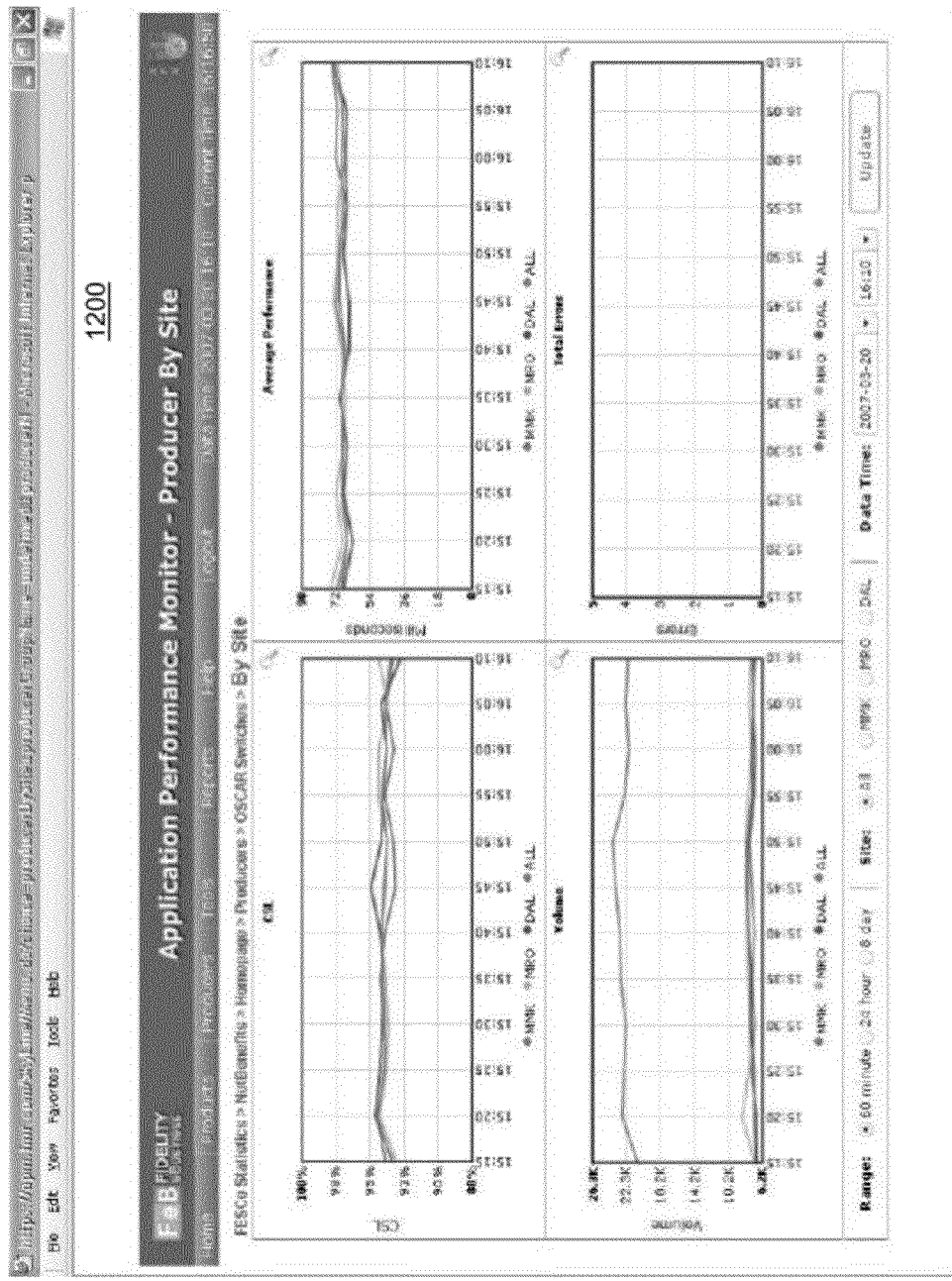
Figure 13:
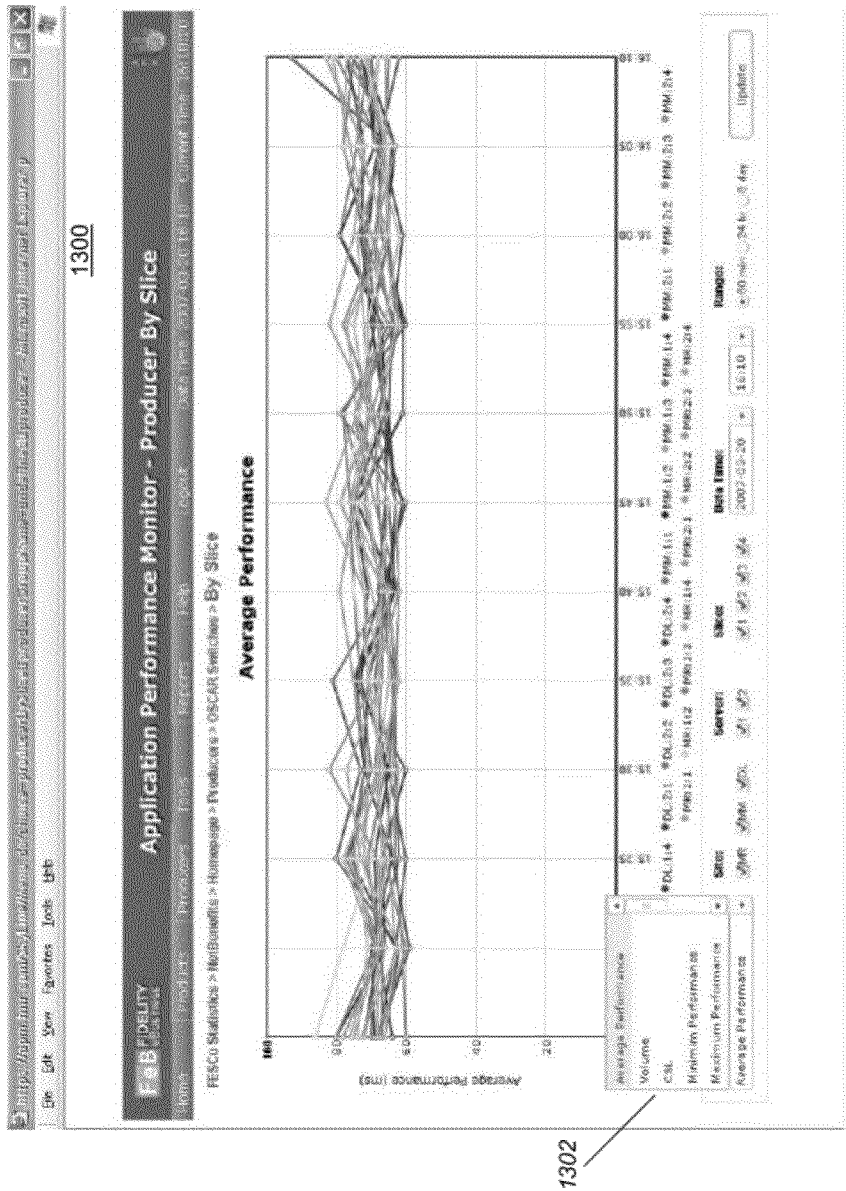

When a user (e.g., an employee of the enterprise) clicks on a "Producers" link 406 provided on a navigation bar 402 of the Business Unit Homepage 400, a menu of data service producers is provided. The user may select a "NB Common" link from the menu of data service producers to obtain more detailed information about the performance of the monitored elements of the NetBenefits product that are data service producers. In the example screenshot of FIG. 10, a NB Common dashboard 1000 is provided in which a list of data service producers associated with the NetBenefits product is shown. This page displays volume, target, CSL, performance, error and close information for each producer. Suppose, for example, that the user clicks on producer name, e.g., OSCAR switches. This action causes the user to navigate to a OSCAR switches Producer Summary page 1100 depicted in FIG. 11. The Producer Summary page 1100 provides a number of graphs (e.g., CSL/Volume 1102, Average Performance 1104, Total Errors 1106, and Performance Histogram 1108) that visually depict performance data associated with the OSCAR switches data service producer, for example, for each 5-minute interval during a 60-minute period. The Producer Summary page 1100 also provides selectable buttons: "By Site," 1110 and "By Slice," 1112 that enable the user to drill down to pages which show the performance data using different metrics. For example, clicking on the "By Site" button 1110 navigates the user to the example Producer by Site page 1200 shown in FIG. 12, in which the performance data (e.g., CSL, Average Performance, Volume, and Total Errors) is broken down by physical site (e.g., ALL, MMK, MRO, and DAL). Likewise, clicking on the "By Slice" button 1112 navigates the user to the example Producer by Slice page 1300 shown in FIG. 13, in which the average performance of the OSCAR switch over a 60-minute interval is shown. The display of this graph can be changed to a number of other metrics (e.g., Volume, CSL, Minimum Performance, Maximum Performance) by selecting one of the options displayed in the menu 1302.

By measuring and monitoring the performance of an enterprise application at varying levels of granularity (e.g., at a data provider level, at a data service producer level, at a web server level, and/or at an end-to-end user level), sufficient information may be provided to the monitoring tool 142 for use in generating detailed breakdowns of the performance of the enterprise application as it relates to producers, sites, clones, etc. Such breakdowns may aid the enterprise in more clearly identifying and/or investigating a problem area (e.g., CSL for MRO is significantly lower than CSL for DAL and MMK) so that troubleshooting of that problem area may be performed efficiently and effectively, as well as to diagnose customer impact.

Although the visual indicators of performance are described and depicted in terms of pie charts, bar versions of histograms, and histograms, any appropriate visual indicator and combination of visual indicators can be used. In addition, these visual indicators can be assembled in a way to create customizable screens for different users and/or for user role types.

Additional Data Processing Components

In some implementations, the enterprise network includes a server computer 120 that runs a correlation engine 144 that captures, measures, and analyzes error data and informational logs generated by the application performance monitoring tool 142. In one example, the correlation engine 112 receives as input (e.g., from Adlex Inc.) statistics related to traffic patterns on the Internet and uses these statistics to provide a historical context to the real-time reports generated by the application performance monitoring tool 142. In this manner, the enterprise can differentiate between a CSL that is negatively impacted by an enterprise-related event (e.g., the failure of a data service producer) as opposed to a non-enterprise-related event (e.g., the crippling effects of a virus spread on the Internet). The correlation engine 144 may also receive as input statistics related to traffic patterns within the enterprise network (e.g., across different web applications) to identify trends over various periods of time. In this manner, the enterprise may be able to identify periods of high volume corresponding to a particular time of the month (e.g., high volume bimonthly during pay periods, high volume every April during tax season) and adjust the distribution of server computer clones to avoid overloading or reduced CSLs.

Figure 14:
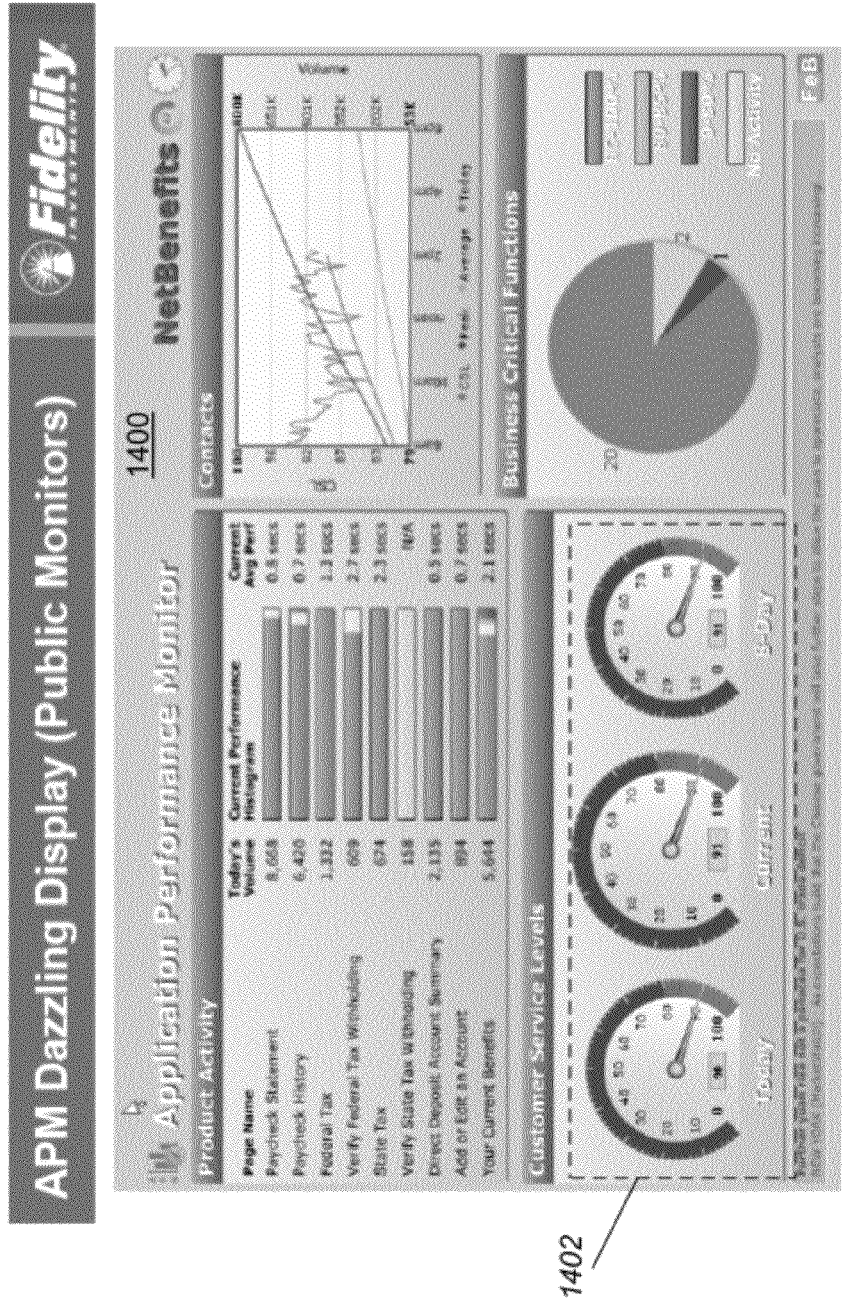

In some implementations, the enterprise network 110 includes a server computer 120 that runs a Dazzling Display CSL Monitor 146. Referring to the screenshot of FIG. 14, in one example, the Dazzling Display CSL Monitor 1400 is used to communicate summary real-time application performance information on large display monitors. Key information about the BCF are displayed including current volume, CSL and performance in data and graphical format including histogram, line graph, and pie chart format. In addition, an odometer visual tool 1402 is used to show the application's CSL for current, today and 8-day results.

Figure 15:
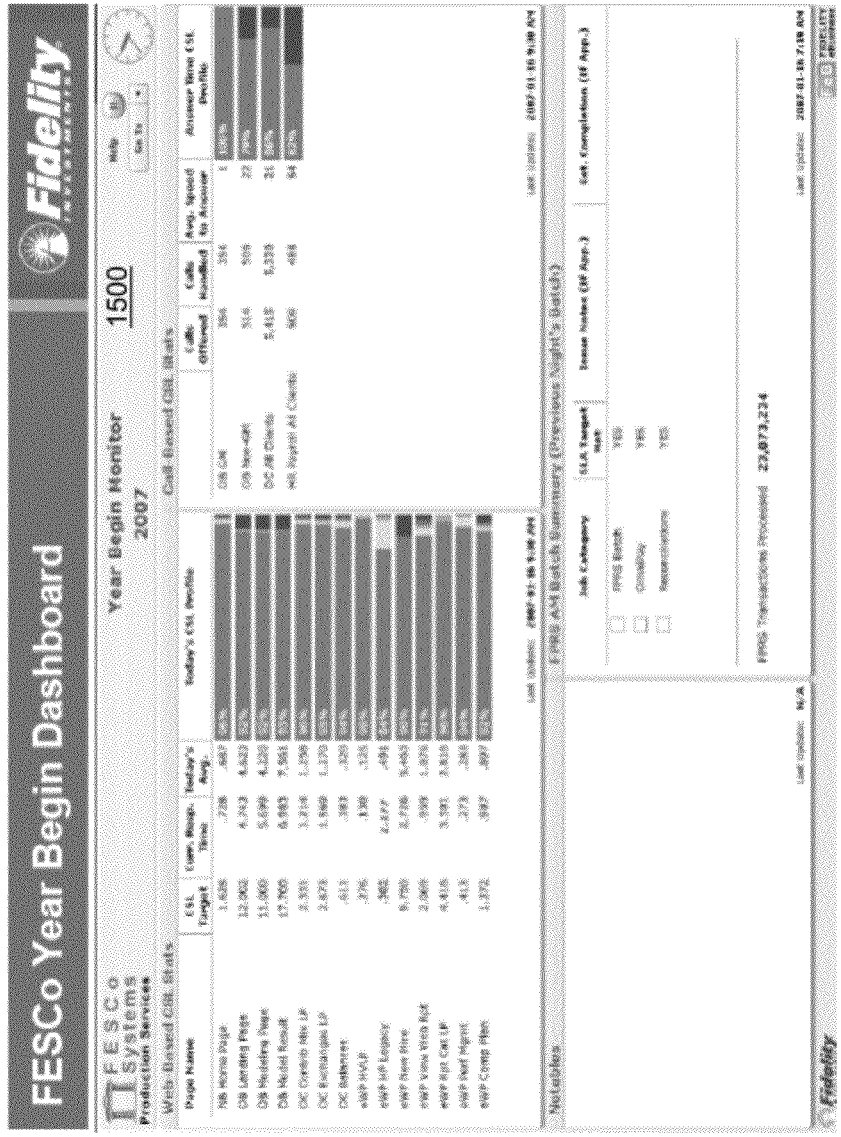
Figure 16:
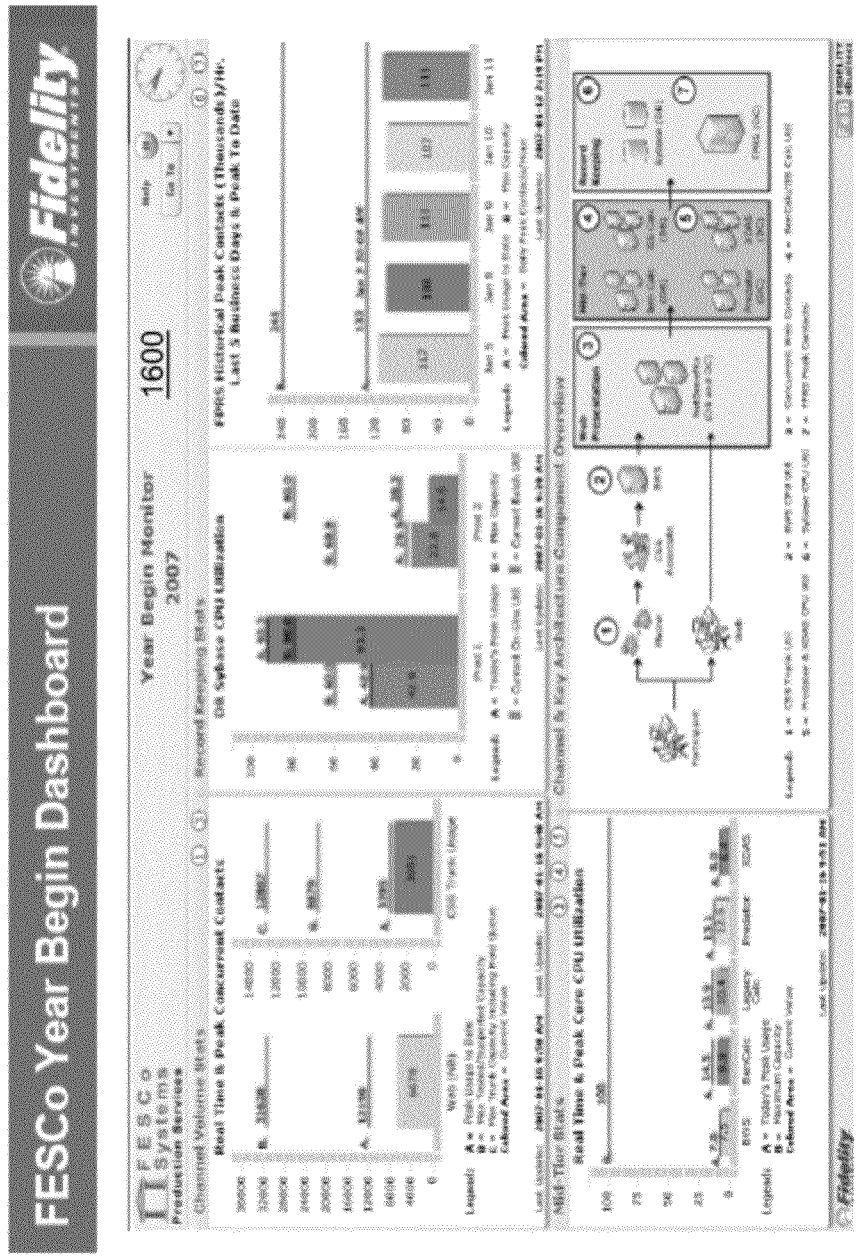
Figure 17:
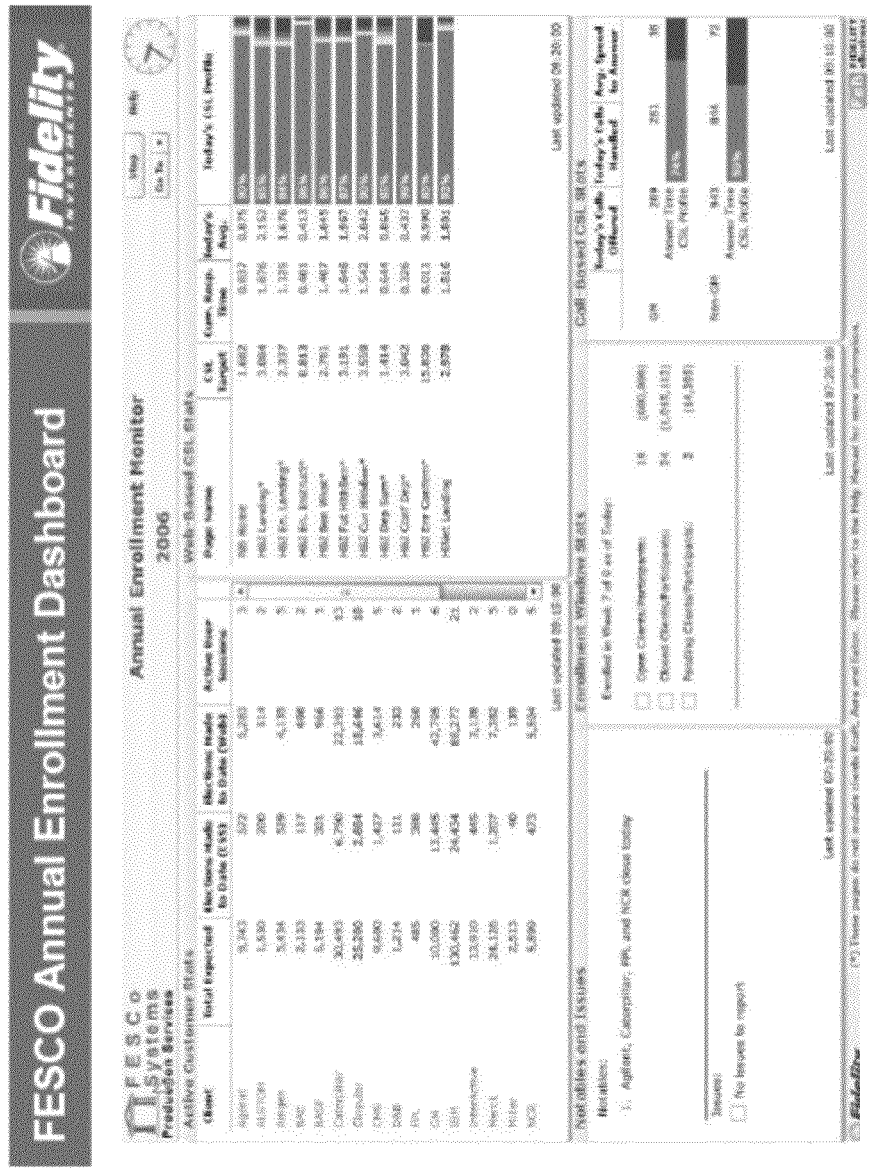
Figure 18:
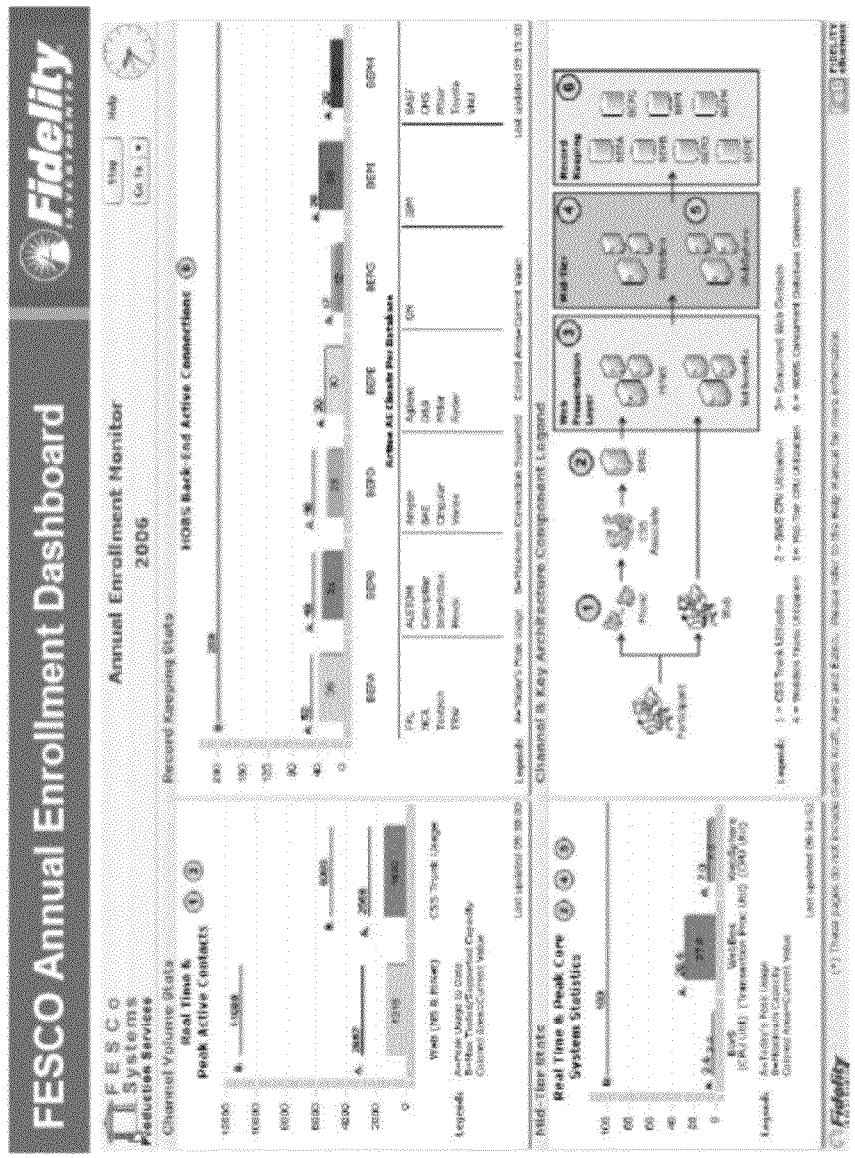
Figure 20:
Figure 22:
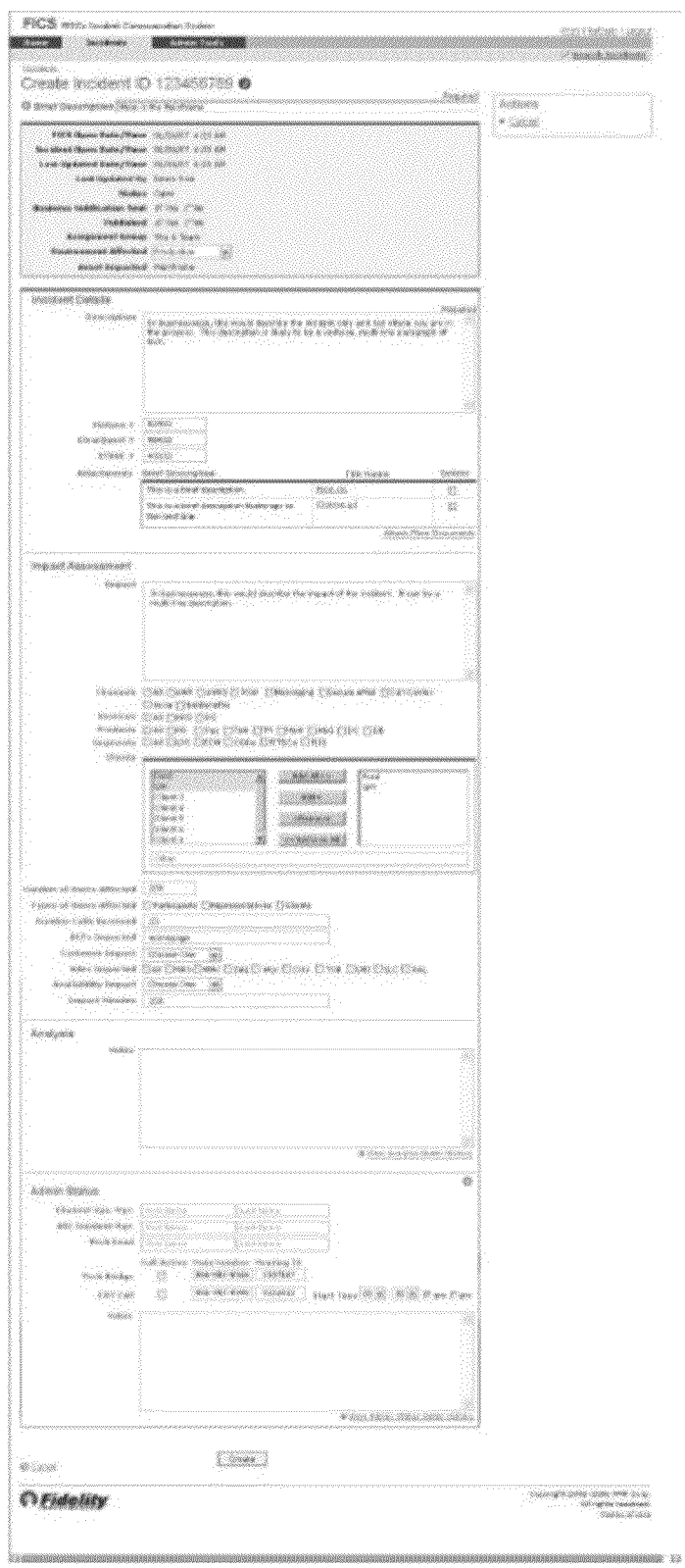

In some implementations, the enterprise network 110 includes a server computer 120 that runs a Systems Infrastructure Dashboard 148. The Systems Infrastructure Dashboard may be used to support the daily operations of the systems operations and support groups particularly for large seasonal events. For example, FIGS. 15 and 16 show exemplary Systems Infrastructure Dashboards 1500, 1600 for year end events; FIGS. 17 and 18 show exemplary Systems Infrastructure Dashboards 1700, 1800 for annual enrollments. These Systems Infrastructure Dashboards 1500, 1600, 1700, 1800 allow for the end-to-end systems health view for the web layer, middle-tier layer and back-end layer by use of key metrics that are calculated, accumulated and display for each of these layers.

In some implementations, the enterprise network 110 includes a server computer 120 that runs a Customer Experience Dashboard 150. This may be used to support the operations of the business operations support function and to better attain the health of the customer (both external and internal) facing applications and systems. This Customer Experience Dashboard summarizes metrics across different kinds of data sources: real-time and historical; actual and synthetic traffic; page, producer and operational performance data; internally and externally sourced performance data; internal tools (to support internal customers, e.g., call center and back office) and external products (to support external customers). Internally sourced performance data refers to data collected with the infrastructure whereas externally sourced performance data refers to data collected outside the infrastructure and is sometimes provided by a third party source. Together these data sources provide a holistic view of customer experience to enable a decision maker affiliated with the enterprise to make necessary business-related decisions, prepare related quality analysis reports and understand customer impact and experience. Measurements may include incident information, crisis data, utilization patterns, cross-channel usage, service level metrics and customer impact assessment. In addition, the Customer Experience Dashboard serves as a central communication tool as it is a single portal to key operational data such as incident information (see FIGS. 19, 20, 21, and 22).

Figure 23:
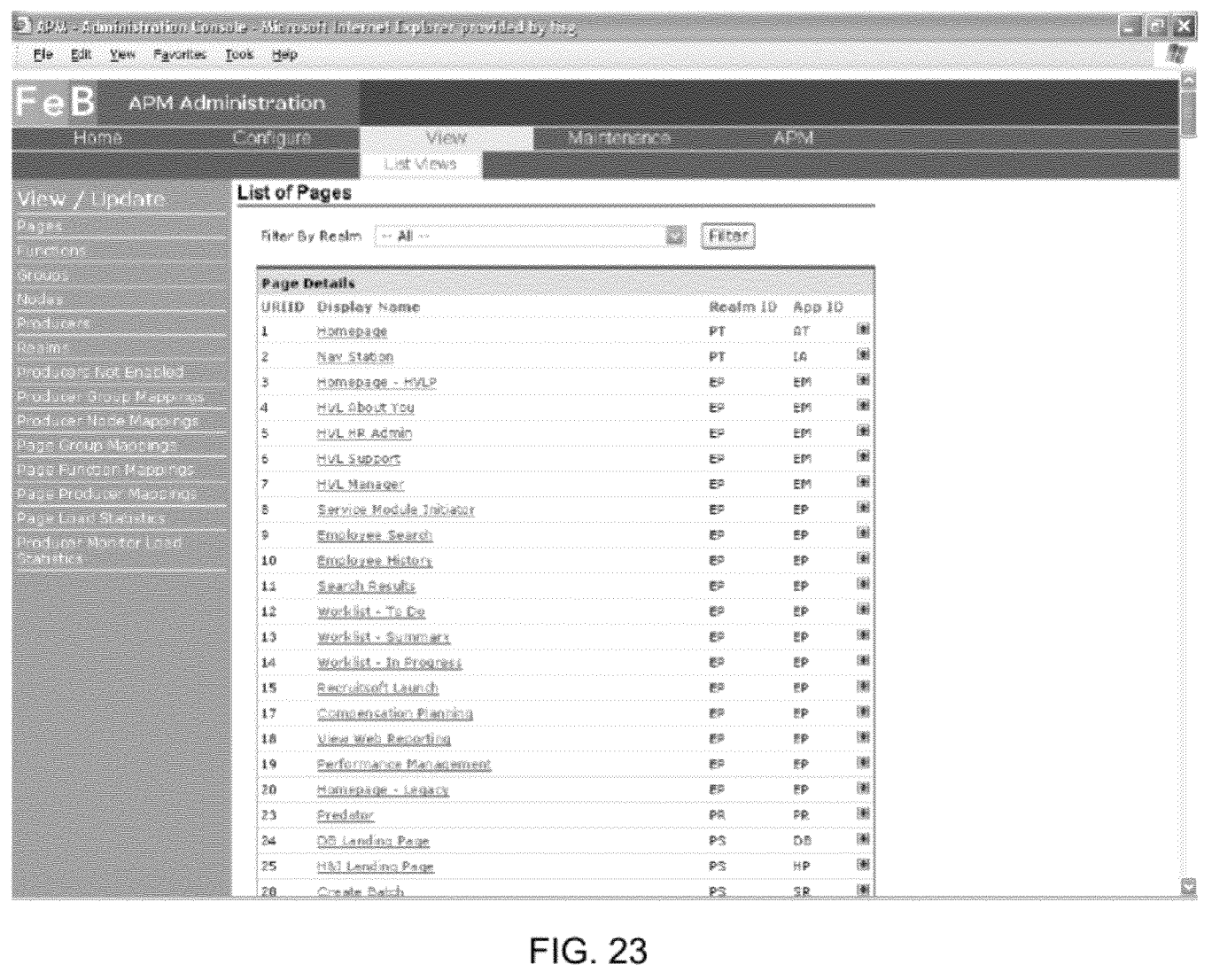
Figure 24:
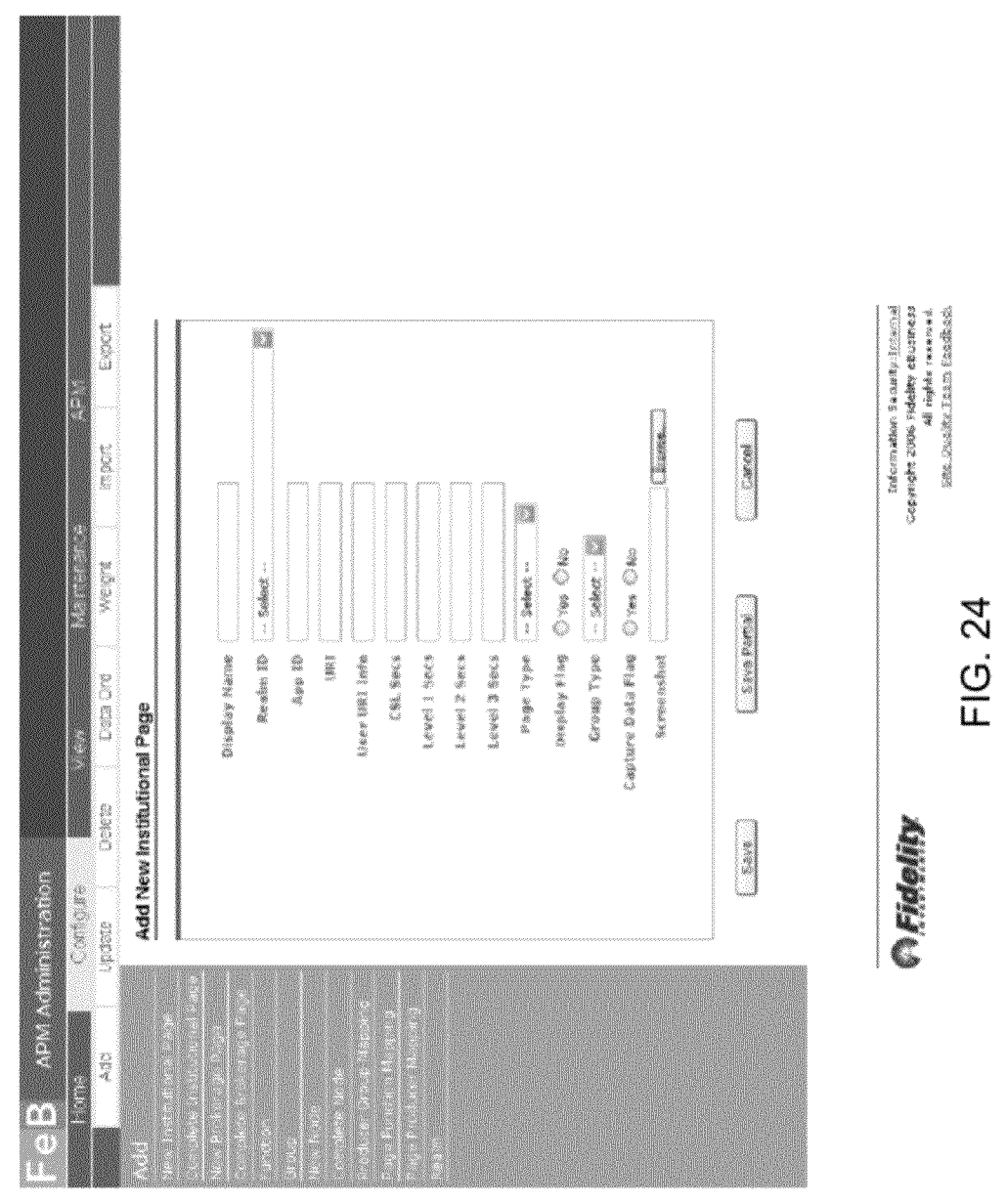
Figure 25:
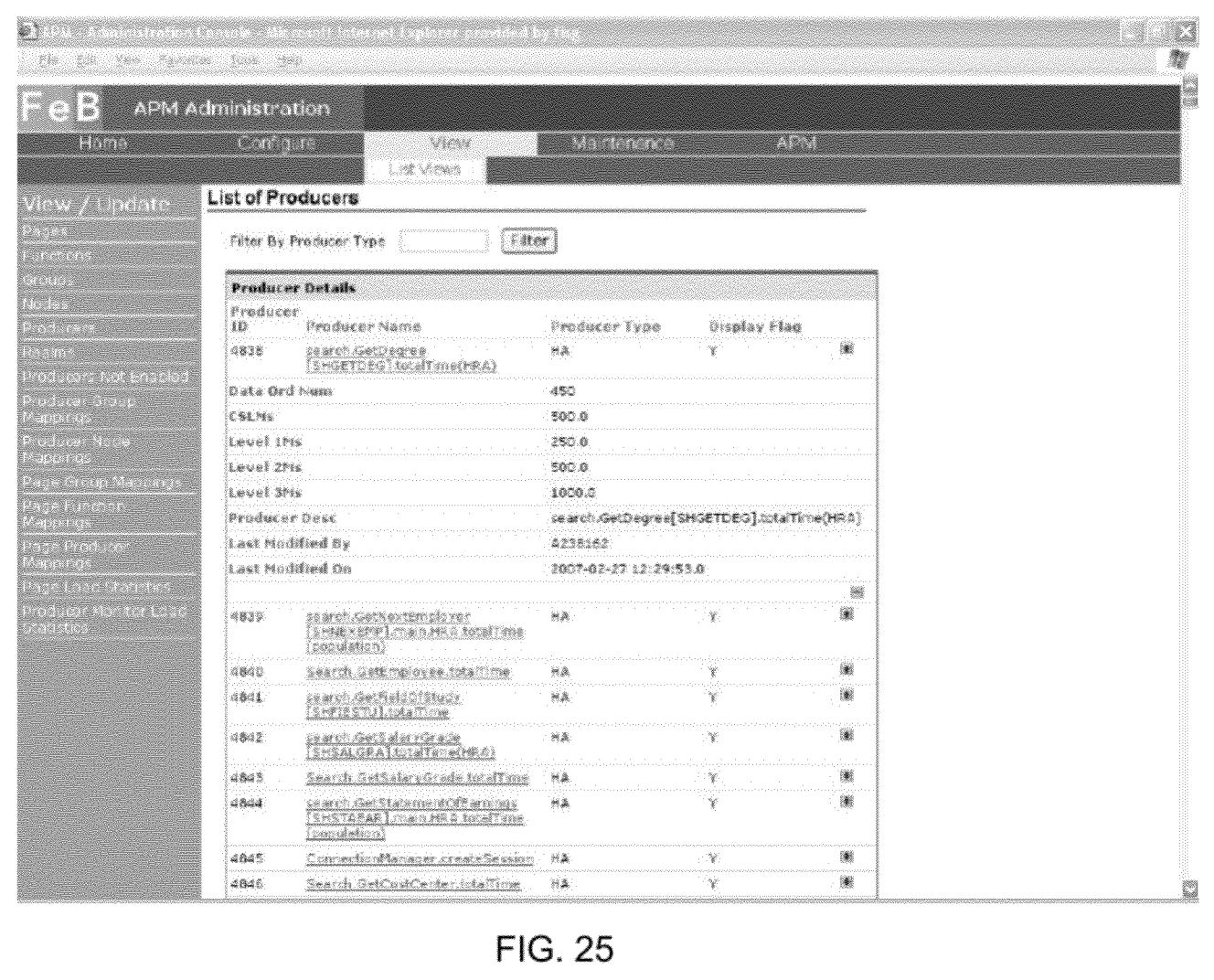

In some implementations, the enterprise network 110 includes a server computer 120 that runs an Admin Console 152. Referring to FIGS. 23, 24, and 25, the Admin Console is used to streamline the administration of the underlying APM data. It helps in the administering additions, modifications and deletions of APM supporting data (e.g., URIs, Producers, Nodes, Realms) and their corresponding associations and mappings information (e.g., functions, page to function mappings, page to group mappings, page to producer mappings, and producer to group mappings). It also includes functionality to make batch updates to page Customer Service Levels (CSLs). In effect, this tool allows for the reduction in the administration workload of APM developers, improvement in response time for customers on application administration, and reduction of errors in administration.

In some implementations, the enterprise network 110 includes a server computer 120 that runs an alert notification engine 154. The alert notification engine 154 may be configured with a set of robust configurable rules, which are applied (in some cases, continually) against the data collected by the application performance monitoring tool 142, to detect abnormalities, trends, and/or short and long term performance issues. The set of rules may include various trigger thresholds and alarming levels, and may identify one or more groups that are to be notified of a performance issue that may require attention. In one example, when a current CSL for homepage of NetBenefits product falls below 83%, the alert notification engine 146 automatically sends a notification message to an application-level monitoring team (e.g., a monitoring team specific to the NetBenefits product) as well as an enterprise-level monitoring team (e.g., a monitoring team that oversees the health of all or a large subset of the enterprise's deployed web applications). These notification messages are sent as soon as the alert notification engine detects a satisfaction of a rule within the set. In this manner, the application-level and/or enterprise-level monitoring teams are notified of the performance issue in real-time and may take steps to address the issue before it escalates any further.

In some implementations, the enterprise network 110 includes a server computer 120 that runs an outlier data analysis tool 156 that analyzes data samples (captured by the application performance monitoring tool 142) that fall significantly outside the norm. These data samples, also referred to as "outlier data," represent customers that have received very poor performance. Generally, the outlier data analysis tool 156 examines outlier data against a number of different variables to determine whether there is a common cause (e.g., location of user, time of day, system site, system identifier, customer identifier, etc.) or a number of common causes of the outlier data, which may then be corrected or otherwise attended to.

In some implementations, the enterprise network 110 includes a server computer 120 that runs one or more third party application performance monitoring tools 158. These tools 158 incorporate data from external data sources to measure and monitor for two key purposes. First, to measure and monitor the performance of third party applications that are incorporated into the various product suites and used by customers particularly for those key pages considered as BCF and Secondary pages. These third party applications are often not able to be measured once the user's transaction is outside of the infrastructure. Secondly, to measure and monitor key product pages and transactions from outside of the infrastructure so as to gather information on complete web page performance (as opposed to only the longest item on the page) as well as the total roundtrip performance time outside of the infrastructure through the network and to the customer computer. Generally, these tools 158 monitor the availability, performance, and activity on the third party web applications, developed by third party web vendors, that run outside of the enterprise network 110. Although described as being separate and distinct from the application performance monitoring tool 142, there are instances in which the functionality of a third party application performance monitoring tool 158 is integrated into the application performance monitoring tool 142.

Performance Methodology

The application performance monitoring tool 142 is strongly rooted in a rich performance methodology that was developed to support the tools and provides the underlying related processes and metrics. This performance methodology, known as FPM (Fidelity eBusiness Performance Methodology), provides a repeatable model for triaging each supported product or system and identifying its core monitored elements, e.g., BCF, Secondary and tertiary as well as its related data service producers. These prioritized monitored elements (e.g., BCFs) are used not only for performance monitoring by the monitoring tool 142, but are also the common identifiers in many related operational processes such as service and support and availability reporting.

Figure 26:
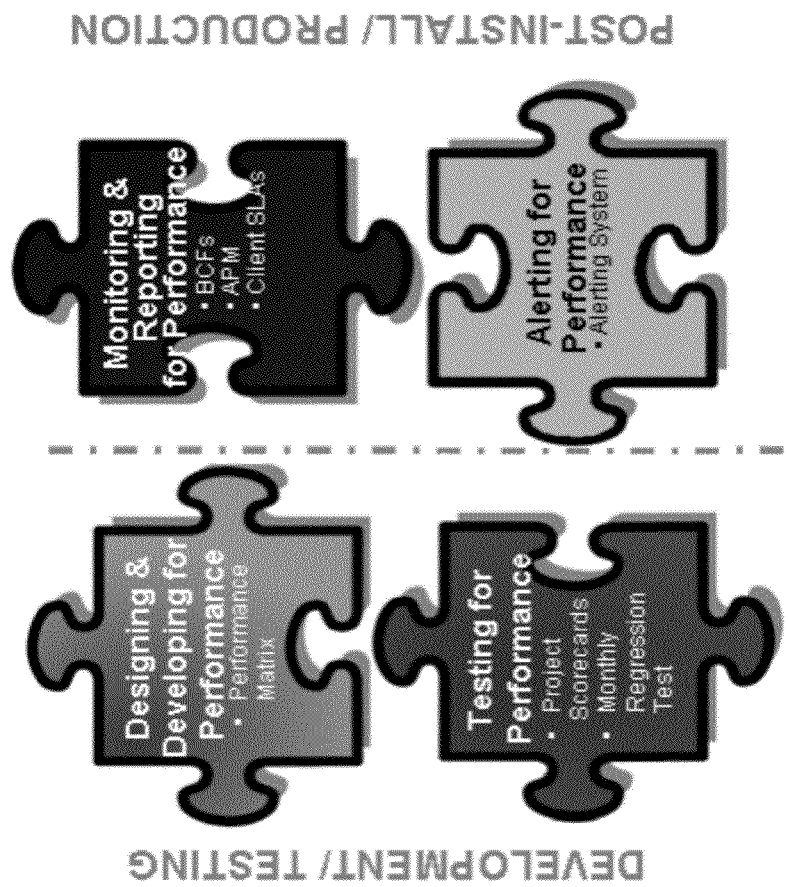
FIG. 26 shows components of a performance methodology.

To be effective, a product's performance needs to not only be actively monitored but also has to be considered during the entire web page and related data producer lifecycle including design, development, testing and transition to its live production state (see FIG. 26). FPM provides the structure for that consideration by imposing checkpoints as well as the important focus on end customer targets as categorized in the Performance Matrix (FIG. 27), as opposed to previously used internal system operating standards and definitions. This Performance Matrix contains several categories of customer targets based on customer page type expectations and was developed by a comprehensive comparative external benchmark analysis.

One of the integral processes of FPM that the monitoring tool 142 leverages is the Quarterly 92nd Percentile Benchmark analysis. At the end of each 90-day calendar quarter, a query is completed for each web page where the 92nd percentile of each day's data is obtained. The 92nd percentile was originally selected based on analysis that it provided a sufficient amount of the performance data set in comparison with alternative 95th or 90th percentiles. Next, the values are sorted in data order and the median value is extracted from the data set. This value is then set in the monitoring tool 142 during the first week following the end of a quarter as the new historical benchmark to which new page performance is measured against for the monitors. Benchmarks are updated so that fluctuations in monitoring tool 142 are based on changes on known and recent performance and account for changes in new code, infrastructure, etc. Separately, as part of the quarterly benchmark process, a comparison of the new quarter's data is made to previous quarters. Changes in the data is noted and flagged particularly for more material changes of +/−15%. If there was a change between the current quarter and the previous quarter such that the current quarter decreased by less than or equal to 15%, it represents an improvement (marked as green). Conversely, if there was a change between the current quarter and the previous quarter such that the current quarter increased by 15% or more percent, then it represents a performance degradation (marked as red). Generally, pages that degraded will require follow-up system analysis to investigate the cause and results may sometimes trigger a development work item. Additional detailed rules also exist that help business and system owners manage and decipher anomalies and changes in the performance of these elements (similar rules exist for producer thresholds as well as external sourced data), as well as impact to customer experience.

The described techniques can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a customer or application provider operator (generically referred to as a user), the techniques described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element, for example, by clicking a button on such a pointing device). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The techniques described herein can be implemented in a distributed computing system that includes a back-end component, e.g., as a data server, and/or a middleware component, e.g., an application server, and/or a front-end component, e.g., a client computer having a graphical user interface and/or a web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact over a communication network. The relationship of client and server arises by virtue of computer programs running on the respective computers and having a client-server relationship to each other.

Other embodiments are within the scope of the following claims. For example, the described techniques can be performed in a different order and still achieve desirable results. Although the description discusses the context of web pages of a web application, other systems which enable user interaction through a communication network may also benefit from the features discussed.

What is claimed is:

1. A computer-based method comprising:
monitoring execution of a transaction associated with a first user session of a multi-tier enterprise application, the execution of the transaction using a first component on a first tier and a second component on a second, different tier of the enterprise application;
generating, by a computer system, a first performance record that includes:
a transaction identifier that uniquely identifies the transaction,
a first component identifier that uniquely identifies the first component, and
first performance data being representative of the performance of the first component executing the transaction;
generating, by the computer system, a second, different performance record that includes:
the transaction identifier,
a second component identifier that uniquely identifies the second component, and
second performance data being representative of the performance of the second
component executing the transaction; and
determining, by the computer system, based on the first performance record and the second performance record whether the transaction is associated with a prioritized aspect of the enterprise application, and if so, taking an action based on the determining;
wherein taking an action comprises:
identifying a target performance value for the transaction;
identifying an acceptable performance value, different from the target performance value, for the transaction; and
comparing the performance value included in the first performance record and the second performance record with the identified target performance value and the acceptable performance value to determine the quality of performance the first component and the second component; and
providing in a graphical user interface, a visual indicator of a performance of one or more monitored elements of the enterprise application during an execution of a transaction associated with a user session with the enterprise application; with each of the one or more monitored elements being associated with a customer impact identifier that comprises one of a business critical function identifier, a secondary function identifier, and a tertiary function identifier.

2. The method of claim 1, further comprises:
generating information related to a plurality of transactions, the information including the first performance record.

3. The method of claim 2, wherein each transaction in the plurality of transactions is associated with the first user session.

4. The method of claim 2, further comprising generating information including performance data that is representative of how well components in at least two tiers of the enterprise application perform in executing respective ones of the plurality of transactions.

5. The method of claim 1, wherein the transaction corresponds to an instance of a user request for data stored on one or more components in a data tier of the enterprise application.

6. The method of claim 1, wherein the first performance record includes performance data that is defined using a time-based metric.

7. The method of claim 1, wherein determining whether the transaction is associated with a prioritized aspect of the enterprise application comprises:
examining the first performance record to determine whether the first performance record includes an indicator that the transaction corresponds to an instance of a user request for an aspect of the enterprise application that is associated with one of the business critical secondary tertiary functions.

8. The method of claim 1, wherein the transaction corresponds to an instance of a user request for an aspect of the enterprise application, and wherein determining whether the transaction is associated with a prioritized aspect of the enterprise application comprises:
examining the first performance record to identify a prioritization level that is associated with the user requested aspect.

9. The method of claim 8, wherein the prioritization level comprises at least two discrete prioritization levels.

10. The method of claim 1, wherein the enterprise application comprises a web-based enterprise application and the transaction corresponds to an instance of a user request for a web page that includes one or more objects formed by data stored on one or more components in a data tier of the enterprise application.

11. The method of claim 10, wherein determining whether the transaction is associated with a prioritized aspect of the web-based enterprise application comprises:
determining whether the transaction is associated with a user request for a business critical function web page, a secondary function web page, or a tertiary function web page.

12. The method of claim 1, wherein taking an action comprises:
identifying a target performance value for each monitored element of the enterprise application that is involved in the transaction; and
for each monitored element, comparing its performance value included in the first performance record with its target performance value to determine whether the monitored element performed satisfactorily during the transaction.

13. The method of claim 1, further comprising:
providing in the graphical user interface, a visual indicator of a performance of the enterprise application in executing a plurality of transactions associated with one or more user sessions with the enterprise application, each of the plurality of transactions being associated with a prioritized aspect of the enterprise application, the transaction being one of the plurality of transactions.

14. The method of claim 13, wherein the visual indicator comprises one or more of the following: a pie chart, a bar version of a histogram, and a histogram.

15. The method of claim 13, wherein the visual indicator provides a visual representation of a degree at which the performance of the enterprise application satisfies a customer experience while interacting with the enterprise application.

16. The method of claim 13, wherein the visual indicator provides a visual cue to an enterprise application provider of a presence of a performance-related issue in the enterprise application that has a negative effect on the performance of the enterprise application.

17. The method of claim 16, wherein the visual indicator further provides a visual cue to the enterprise application provider of an extent to which the performance-related issue in the enterprise application has a negative effect on the performance.

18. The method of claim 1, wherein the one or more monitored elements comprise one or more of the following: a web page of the enterprise application, and a data service producer of the enterprise application.

19. A computer program product, embodying a machine-readable storage medium, the computer program product including instructions operable to cause a data processing apparatus to:
monitor execution of a transaction associated with a first user session of a multi-tier enterprise application, the execution of the transaction using a first component on a first tier and a second component on a second different tier of the enterprise application;
generate a first information that includes:
a transaction identifier that uniquely identifies the transaction,
a first component identifier that uniquely identifies the first component, and
first performance data being representative of the performance of the first component executing the transaction;
generate a second information that includes:
the transaction identifier,
a second component identifier that uniquely identifies the second component, and
second performance data being representative of the performance of the second
component executing the transaction; and
determine based on the first performance record and the second performance record whether the transaction is associated with a prioritized aspect of the enterprise application, and if so, take an action based on the determination;
wherein instructions to take an action comprises instructions to:
identify a target performance value for the transaction;
identify an acceptable performance value, different from the target performance value, for the transaction; and
compare the performance value included in the first performance record and the second performance record with the identified target performance value and the acceptable performance value to determine the quality of performance the first component and the second component; and
provide in a graphical user interface a visual indicator of a performance of one or more monitored elements of the enterprise application during an execution of a transaction associated with a user session with the enterprise application, with each of the one or more monitored elements being associated with a customer impact identifier that comprises one of a business critical function identifier, a secondary function identifier, and a tertiary function identifier.

20. The computer program product of claim 19, wherein instructions operable to cause the data processing apparatus to determine whether the transaction is associated with a prioritized aspect of the enterprise application comprises instructions to:
examine the first performance record to determine whether the first performance record includes an indicator that the transaction corresponds to an instance of a user request for an aspect of the enterprise application that is associated with one of the business critical secondary tertiary functions.

21. The computer program product of claim 19, wherein the transaction corresponds to an instance of a user request for an aspect of the enterprise application, and wherein instructions operable to cause the data processing apparatus to determine whether the transaction is associated with a prioritized aspect of the enterprise application comprises instructions to:
examine the first performance record to identify a prioritization level that is associated with the user requested aspect.

22. The computer program product of claim 21, wherein the prioritization level comprises at least two discrete prioritization levels.

23. The computer program product of claim 19, further comprising instructions operable to cause the data processing apparatus to:
identify a target performance value for each monitored element of the enterprise application that is involved in the transaction; and
for each monitored element, compare its performance value included in the first performance record with its target performance value to determine whether the monitored element performed satisfactorily during the transaction.

24. The computer program product of claim 19, further comprising instructions operable to cause the data processing apparatus to:
provide in the graphical user interface, a visual indicator of a performance of the enterprise application in executing a plurality of transactions associated with one or more user sessions with the enterprise application, each of the plurality of transactions being associated with a prioritized aspect of the enterprise application, the transaction being one of the plurality of transactions.

25. The computer program product of claim 24, wherein the visual indicator comprises one or more of the following: a pie chart, a bar version of a histogram, and a histogram.

26. The computer program product of claim 24, wherein the visual indicator provides a visual representation of a degree at which the performance of the enterprise application satisfies a customer experience while interacting with the enterprise application.

27. The computer program product of claim 24, wherein the visual indicator provides a visual cue to an enterprise application provider of a presence of a performance-related issue in the enterprise application that has a negative effect on the performance of the enterprise application.

28. The computer program product of claim 27, wherein the visual indicator further provides a visual cue to the enterprise application provider of an extent to which the performance-related issue in the enterprise application has a negative effect on the performance.

29. The computer program product of claim 19, further comprising instructions operable to cause the data processing apparatus to:
provide in a graphical user interface, a visual indicator of a performance of one or more monitored elements of the enterprise application during an execution of a transaction associated with a user session with the enterprise application.

30. The computer program product of claim 29, wherein the one or more monitored elements comprise one or more of the following: a web page of the enterprise application, and a data service producer of the enterprise application.

31. The computer program product of claim 29, wherein each of the one or more monitored elements is associated with a customer impact identifier.

32. The computer program product of claim 31, wherein the customer impact identifier comprises one of the following: a business critical function identifier, a secondary function identifier, and a tertiary function identifier.

33. A system comprising:
an application performance monitoring tool including one or more computers programmed to perform operations operable to:
receive a transaction associated with a first user session of a multi-tier enterprise application;
monitor execution of the transaction associated with a first user session of the multi-tier enterprise application, the execution using a first component on a first tier and a second component on a second different tier of the enterprise application;
generate a first performance record that includes:
a transaction identifier that uniquely identifies the transaction,
a first component identifier that uniquely identifies the first component, and
first performance data being representative of the performance of the first component executing the transaction;
generate a second performance record that includes:
the transaction identifier,
a second component identifier that uniquely identifies the second component, and
second performance data being representative of the performance of the second
component executing the transaction; and
determine based on the first performance record and the second performance record whether the transaction is associated with a prioritized aspect of the enterprise application, and if so, take an action based on the determination;
wherein the system taking an action comprises the system configured to:
identify a target performance value for the transaction;
identify an acceptable performance value, different from the target performance value, for the transaction; and
compare the performance value included in the first performance record and the second performance record with the identified target performance value and the acceptable performance value to determine the quality of performance the first component and the second component; and
provide in a graphical user interface a visual indicator of a performance of one or more monitored elements of the enterprise application during an execution of a transaction associated with a user session with the enterprise application, with each of the one or more monitored elements being associated with a customer impact identifier that comprises one of a business critical function identifier, a secondary function identifier, and a tertiary function identifier.

34. The system of claim 33, wherein the application performance monitoring tool stores performance records in a monitoring database related to transactions associated with user sessions with the enterprise application, the user sessions including the first user session.

35. The system of claim 34, wherein the monitoring database stores performance data that is representative of how well components in at least two tiers of the enterprise application perform in executing respective ones of the transactions.

36. The system of claim 33, wherein the transaction corresponds to an instance of a user request for data stored on one or more components in a data tier of the enterprise application.

37. The system of claim 33, wherein the first performance record includes performance data that is defined using a time-based metric.

38. The system of claim 33, wherein the application performance monitoring tool is operable to determine whether the transaction is associated with a prioritized aspect of the enterprise application by examining the first performance record to determine whether the first performance record includes an indicator that the transaction corresponds to an instance of a user request for an aspect of the enterprise application that is associated with one of the business critical secondary tertiary functions.

39. The system of claim 33, wherein the transaction corresponds to an instance of a user request for an aspect of the enterprise application, and wherein the application performance monitoring tool is operable to determine whether the transaction is associated with a prioritized aspect of the enterprise application by examining the first performance record to identify a prioritization level that is associated with the user requested aspect.

40. The system of claim 39, wherein the prioritization level comprises at least two discrete prioritization levels.

41. The system of claim 33, wherein the application performance monitoring tool is further operable to:
identify a target performance value for the transaction; and
compare the performance value included in the first performance record and the second performance record with the identified target performance value to determine whether the first component and the second component performed satisfactorily in executing the transaction.

42. The system of claim 33, wherein the application performance monitoring tool is further operable to:
identify a target performance value for each monitored element of the enterprise application that is involved in the transaction; and
for each monitored element, compare its performance value included in the first performance record with its target performance value to determine whether the monitored element performed satisfactorily during the transaction.

43. The system of claim 33, wherein the application performance monitoring tool is further operable to:
provide in the graphical user interface, a visual indicator of a performance of the enterprise application in executing a plurality of transactions associated with one or more user sessions with the enterprise application, each of the plurality of transactions being associated with a prioritized aspect of the enterprise application, the transaction being one of the plurality of transactions.

44. The system of claim 33, wherein the application performance monitoring tool is further operable to:
provide in the graphical user interface, a visual indicator of a performance of one or more monitored elements of the enterprise application during an execution of a transaction associated with a user session with the enterprise application.

45. The system of claim 33, further comprising:
a correlation engine operable to capture, measure, and analyze error data and informational logs generated by the application performance monitoring tool.

46. The system of claim 33, further comprising:
a customer service level monitor operable to communicate summary real-time application performance information for one or more enterprise applications for different time periods.

47. The system of claim 33, further comprising: a system infrastructure dashboard that enables an end-to-end system health view for each of the tiers of the enterprise application.

48. The system of claim 33, further comprising:
a customer experience dashboard that summarizes metrics across one or more of the following data sources: real-time and historical; actual and synthetic traffic; page, producer and operational performance data; internally and externally sourced performance data; internal tools to support internal customers and external products to support external customers.

49. The system of claim 33, further comprising:
an administrative console operable to enable a user to administer additions, modifications and deletions of monitoring tool supporting data, and corresponding associations and mappings information, the monitoring tool supporting data including URI data, producer data, node data, and realm data, and the mappings information including functions, page to function mappings, page to group mappings, page to producer mappings, and producer to group mappings.

50. The system of claim 33, further comprising:
an alert notification engine configured with a set of robust configurable rules, and operable to apply the set of rules against data collected by an application performance monitoring tool, to detect abnormalities, trends, and/or short and long term performance issues, and generate an alert based on the application of the set of rules.

51. The system of claim 33, further comprising:
an outlier data analysis tool operable to examine outlier data against a plurality of variables to determine whether there is a common cause or a number of common causes of the outlier data, and take an action based on the determination.

52. The system of claim 33, further comprising:
a third party application monitoring tool operable to:
measure and monitor the performance of third party applications that are incorporated into the various product suites and used by customers; and
measure and monitor key product pages and transactions from outside of an enterprise network so as to gather information on complete web page performance and total round-trip performance time between a customer client computer and the enterprise network.

* * * * *

UNITED STATES PATENT AND TRADEMARK OFFICE
CERTIFICATE OF CORRECTION

| | | |
|---|---|---|
| PATENT NO. | : 8,166,157 B2 | Page 1 of 1 |
| APPLICATION NO. | : 11/690473 | |
| DATED | : April 24, 2012 | |
| INVENTOR(S) | : Gary R. Couture et al. | |

It is certified that error appears in the above-identified patent and that said Letters Patent is hereby corrected as shown below:

Column 13
Line 52, replace "a graphical" with -- the graphical --

Column 15
Line 57, replace "a graphical user interface" with -- the graphical user interface, --

Column 16
Line 66, replace "a graphical" with -- the graphical --

Column 17
Line 57, replace "a graphical user interface" with -- the graphical user interface, --

Signed and Sealed this
Third Day of July, 2012

David J. Kappos
*Director of the United States Patent and Trademark Office*